(12) United States Patent
Nakauchi et al.

(10) Patent No.: US 8,131,518 B2
(45) Date of Patent: Mar. 6, 2012

(54) METHOD FOR FORMING FUNCTIONAL SPECTRAL FILTER

(75) Inventors: Shigeki Nakauchi, Toyohashi (JP); Tatsuya Onouchi, Toyohashi (JP); Hirohisa Katou, Gamagori (JP); Hirofumi Oda, Gamagori (JP); Yuuji Saitou, Gamagori (JP); Kanae Miyazawa, Gamagori (JP)

(73) Assignees: National University Corporation Toyohashi University of Technology, Toyohashi-Shi (JP); Itoh Optical Industrial Co., Ltd., Gamagori-Shi (JP)

( * ) Notice: Subject to any disclaimer, the term of this patent is extended or adjusted under 35 U.S.C. 154(b) by 809 days.

(21) Appl. No.: 12/223,317

(22) PCT Filed: Feb. 14, 2007

(86) PCT No.: PCT/JP2007/052561
§ 371 (c)(1),
(2), (4) Date: Jul. 29, 2008

(87) PCT Pub. No.: WO2007/094338
PCT Pub. Date: Aug. 23, 2007

(65) Prior Publication Data
US 2010/0179790 A1    Jul. 15, 2010

(30) Foreign Application Priority Data

Feb. 17, 2006 (JP) .................................. 2006-041282
May 29, 2006 (JP) .................................. 2006-148286

(51) Int. Cl.
*G06F 7/60* (2006.01)
*G06F 17/10* (2006.01)
*G02B 5/28* (2006.01)

(52) U.S. Cl. .......................................... 703/2; 359/589

(58) Field of Classification Search .................... 703/2; 434/277–282; 385/37; 359/589
See application file for complete search history.

(56) References Cited

U.S. PATENT DOCUMENTS

| 5,550,625 A * | 8/1996 | Takamatsu et al. ........... 399/301 |
| 2003/0035972 A1 * | 2/2003 | Hanson et al. .................. 428/480 |
| 2006/0279679 A1 * | 12/2006 | Fujisawa et al. ............... 349/116 |

FOREIGN PATENT DOCUMENTS

JP    06-018819    1/1994
(Continued)

OTHER PUBLICATIONS

Tsumura, Norimichi et al., "Optimal Design of Mosaic Color Filters for the Improvement of Image Quality in Electronic Endoscopes", Jul. 28, 1997, Elsevier Science B.V.*

(Continued)

*Primary Examiner* — Paul Rodriguez
*Assistant Examiner* — Cedric D Johnson
(74) *Attorney, Agent, or Firm* — Edwards Wildman Palmer LLP

(57) ABSTRACT

To provide a functional spectral filter through which, it is possible for an observer wearing the functional spectral filter to change his or her color sensitivity (ease of color distinction), and which is for designing a color scheme easy to be distinguished for a color deficient observer by using the filter. A functional spectral filter including a multilayer is formed in accordance with a thin film design (an optimization method) determined by use of a color vision theory so as to make color sensitivity into a desired pattern. With respect to combinations that two colors among a plurality of specified colors are combined, color differences in the respective combinations are made close to a color difference given in advance. Alternatively, with respect to specified combinations, the color differences are made small or the color differences are made large.

13 Claims, 10 Drawing Sheets

FOREIGN PATENT DOCUMENTS

| | | |
|---|---|---|
| JP | 9-503402 | 4/1997 |
| JP | 09-313521 | 12/1997 |
| JP | 2002-303830 | 10/2002 |
| JP | 2003-018611 | 1/2003 |
| JP | 2003-248202 | 9/2003 |
| JP | 2005-167543 | 6/2005 |
| JP | 2006-017684 A | 1/2006 |
| WO | WO-0124224 A1 | 4/2001 |
| WO | WO 0157583 A2 * | 8/2001 |
| WO | WO-0157583 A2 | 8/2001 |

OTHER PUBLICATIONS

Preece, Stephen J. et al., "Spectral Filter Optimization for the Recovery of Parameters which Describe Human Skin", Jan. 2, 2004, IEEE Computer Society.*

Quan, Shuxue, "Evaluation and Optimal Design of Spectral Sensitivities for Digital Color Imaging", Apr. 2002, Imaging Science of the College of Science, Rochester Institute of Technology.*

Supplementary European Search Report for European Patent Application No. 07708365.7 dated Dec. 27, 2010.

Hans Brettel et al., "Computerized simulation of color appearance for dichromats," Journal of Optical Society of America A, vol. 14, No. 10, 1997, pp. 2647-2655 and a cover page.

Markku Hauta-Kasari et al., "Spectral vision system for measuring color images," Journal of Optical Society of America A, vol. 16, No. 10, 1999, pp. 2352-2362 and a cover page.

International Search Report mailed May 22, 2007, issued on PCT/JP2007/052561.

* cited by examiner

METHOD FOR FORMING FUNCTIONAL SPECTRAL FILTER

TECHNICAL FIELD

The present invention relates to a method for forming a functional spectral filter. In particular, the present invention relates to a method for forming a transmission type functional spectral filter, which is suitable as a tool to correct color vision of a color deficient observer, and reversely, to allow a color normal observer to experience the inconveniences of a color deficient observer, so as to deepen understanding about the color deficient observer.

Here, a case of a transmission type functional spectral filter will be mainly described as an example. However, a case of a reflection type (mirror type) functional spectral filter is equally applicable.

The term "tool" here means, for example, filters disposed in front of or inside imaging devices such as cameras, photodiodes, and monochrome cameras, filters disposed in front of or inside optical systems such as televisions, monitors, and various light sources, and spectacle lenses, contact lenses, intraocular lenses, and the like, which are not particularly limited. For example, a case of only a glass plate, a plastic plate, or the like may be considered.

BACKGROUND ART

It has been described that among Japanese males one in twenty (approximately 5%) are color deficient observers, while among white males one in twelve (approximately 8%) are color deficient observers. Color deficient observers are color deficient due to any of three cone photoreceptor cells existing in color normal observers being abnormal or defective. A case of a defective red cone photoreceptor cell is called a "protan deficiency," a case of a defective green cone photoreceptor cell is called a "deutan deficiency," and a case of a defective blue cone photoreceptor cell is called a "tritan deficiency."

Among these, the tritan deficiency is at a low frequency, which is one person per several million people, and therefore, the term "color deficient" typically means the protan deficiency and the deutan deficiency.

Because the protanopes and the deuteranopes have similar sensitivity curves in the red cone photoreceptor cell and green cone photoreceptor cell, color appearances and color combinations (combination colors) difficult to differentiate between them are very similar. It has been described that it is difficult for the protanopes and the deuteranopes to sense a difference between the colors in a combination of red and green.

Today, a variety of innovations are taken toward color schemes with the aim of enhancing information in various types of print materials, notices, electronic images, and the like in one's immediate surroundings. However, even if it is easy for a color normal observer to recognize information because it is easy to distinguish colors in its color scheme, it is difficult for a color deficient observer to distinguish the colors in the color scheme, and therefore, it is difficult to recognize the information, which leads to a barrier (interference) of information recognition in many cases.

In order to solve this problem, there have been proposed color deficient corrective (correcting) glasses, color improvement/modification means, and the like in Patent Documents 1, 2, and 3.

Methods such as these glasses and means aim to improve the distinction between the colors by correcting transmitted colors with respect to a specific color combination in which it is difficult for a color deficient observer to sense a difference between its colors.

As such, any of these methods controls only the transmittance in a wavelength band with the maximum sensitivity of the three types of cone photoreceptor cells, but does not control the entire visible light wavelength band.

Therefore, those methods have a certain effect on a color combination in which it is difficult for a color deficient observer to distinguish its colors. However, because the control for a transparent wavelength band is imperfect, it is difficult to achieve an effect on other color combinations in some cases.

Further, in these methods, a transmitted light is colored, and for example, it appears reddish overall in some cases. As a result, in many cases, an observer has a sense of discomfort, and feels fatigued in his/her daily life.

Additionally, in recent years, demand for barrier-free designs, and further, a universal design have grown in strength on a worldwide basis. For example, in public facilities, various efforts such as installations of elevators and stair lifts, low-floor buses, toilets for wheelchairs, automobiles and telephone boxes for the disabled have been made.

That is, the concept of a universal design is not to cure or reverse disabilities of the disabled (persons with disabilities), but is intended to consider the possibility that both the physically sound and the disabled live without distinction from the point in time of facility and building design.

Therefore, it is necessary to understand what circumstances cause inconvenience for the disabled.

However, in the present situation, the response to a universal design (barrier-free) for color deficient observers is much less advanced than the response to other disabled. It has been described that a major cause thereof is that it is difficult for color normal observers to intuitively understand the inconveniences which color deficient observers sense.

In response to such a problem, as an effort to give consideration to color deficient observers, in recent years, a method for reproducing colors which color deficient observers sense by color simulation software has been used in some municipalities and the like. That is, a color normal observer experiences a color world which a color deficient observer views in a simulated manner, and an attempt has been made to apply the experience to color designs for public print materials and the like such as disaster prevention hazard maps (refer to Patent Document 4).

In such an image processing method by software, it is necessary to input image data into a personal computer or the like, and to scan and detect a color combination in which it is difficult for a color deficient observer to distinguish its colors by use of a dedicated image processing program. Accordingly, the method is effective for an image formed by a data processing device such as a personal computer, data necessarily input into the data processing device, and the like.

However, in such an image processing method by software, for notices/facilities/public indications which are already installed, industrial products, and the like, because it is necessary to once input image data into a data processing device, and to scan and detect it, there are many working processes, which makes it difficult to import the method into an everyday workflow.

Further, because it is necessary for such an image processing method by software to depend on a method for observing an image on a computer display, resultingly, an entire visual field does not approach to a color world which a color deficient observer senses, and it can only be said that the method is insufficient for an actual sensation of inconveniences. As a greater problem, there is the problem that it is necessary to determine an object in advance, and to take a photograph thereof, and the like, which is inconsistent with real-time performance, and this is far from physically sensing inconveniences in one's daily life.

Patent Document 1: Japanese Published Patent Application No. H06-18819 A
Patent Document 2: Japanese Published Patent Application No. H09-313521 A
Patent Document 3: Japanese Translation of International Application (Kohyo) No. H09-503402 A
Patent Document 4: Japanese Published Patent Application No. 2005-167543 A

DISCLOSURE OF THE INVENTION

Problems to be Solved by the Invention

An object of the present invention is to provide a method for forming a functional spectral filter having a novel structure in which it is possible to vary color sensitivity of a light receiving member into a desired pattern via the filter, and it is possible to solve the above-described various problems, and which can be applied to a wide range of usages.

Another object of the present invention is to provide various tools to which the above-described functional spectral filter is applied, through which it is possible to understand inconveniences in color distinction for a color deficient observer intuitively and with a physical sensation, simply and without requiring expertise, and which can be introduced in a workflow in a practical work.

Means for Solving the Problems

The inventors have dedicated themselves to efforts in the development in order to solve the above-described problems. As a result, they have turned their attention to the point of controlling the spectral transmittance of a sensitivity wavelength band of a light receiving member (a visible light region in a case of eyes, and a sensitivity range in a case of a photoreceiver or the like), and they have given thought to a method for forming a functional spectral filter having the following structures.

A method for forming a transmission type spectral filter having a multilayer film on a transparent base material, and the method includes the steps of describing a spectral transmittance $T(\lambda)$ of the multilayer film as $T(\lambda)=T(p_1, p_2, \ldots, p_n)$ by using parameters $p_1, p_2, \ldots,$ and $p_n$ composed of divided wavelength intervals and transmittances corresponding to the respective wavelength intervals, or function parameters $p_1, p_2, \ldots,$ and $p_n$ when transmittances at a given wavelength are represented as function models, optimizing the parameters $p_1, p_2, \ldots,$ and $p_n$ such that a sensitivity difference pattern formed from sensitivity differences (i.e, color differences) in a sensitivity wavelength band of a light receiving member via the multilayer film between combined two colors for arbitrary combinations that two colors in an object color group consisting of a plurality of specified colors are combined, is made into a desired sensitivity difference pattern, and forming the transmission type spectral filter on the basis of an optimum $T(\lambda)$ described by using the optimized parameters $p_1, p_2, \ldots,$ and $p_n$.

Because the spectral transmittance $T(\lambda)$ of the multilayer transmission film is described with a small number (usually, 20 or less) of parameters, it is made easy to design the spectral transmittance $T(\lambda)$ (an optimum $T(\lambda)$) of the multilayer transmission film exerting a desired sensitivity pattern.

The optimum $T(\lambda)$ is preferably found in accordance with an algorithm as follows.

When a number of colors in the object color group in an object to be observed is N, after spectral reflectances $R_i(\lambda)$ (i=1 to N) of respective colors in the object color group and a spectral distribution $E(\lambda)$ of an illumination light are set, the following (O), (I), (II), and (III) are repeated in this order until the performance evaluated value A is maximized, and $T(\lambda)$ when the performance evaluated value A is maximized is regarded as the optimum $T(\lambda)$.

(O) The spectral transmittance $T(\lambda)$ is initialized by setting an initial value to the respective parameters the first time, and the spectral transmittance $T(\lambda)$ is set by resetting the respective parameters on the basis of an optimization approach on and after the second time.

(I) $C_i = f_1(T(\lambda)R_i(\lambda)E(\lambda))$, which is sensitivity (i.e., color sensation) of the respective colors in the object color group when those are observed through the functional spectral filter having the spectral transmittance $T(\lambda)$, is calculated.

(II) $\Delta E_{i,j} = f_2(C_i, C_j)$, which are sensitivity differences between combined two colors in the respective combinations that two colors in the object color group are combined, on the basis of the sensitivity, is calculated.

(III) A performance evaluated value A at the spectral transmittance $T(\lambda)$ is calculated on the basis of the following formula in which weighting factors $W_{i,j}$ are set such that $T(\lambda)$ becomes the optimum $T(\lambda)$ when A is maximized.

[Formula 1]

When there is a target value (desired sensitivity difference) $\Delta E^t_{i,j}$ for each $\Delta E_{i,j}$ (when there is teacher data), $$A = \sum_{\substack{i,j=1 \\ i<j}}^{N} W_{i,j} f_3(\Delta E_{i,j}, \Delta E^t_{i,j}) \tag{a}$$

when there is no target value for each $\Delta E_{i,j}$ (when there is no teacher data), $$A = \sum_{\substack{i,j=1 \\ i<j}}^{N} W_{i,j} f_{3-1}(\Delta E_{i,j}) \tag{b}$$

Then, in the above method, it is preferable that a color-difference formula CIE94 is used for a calculation of color difference, and a simulated annealing method is used as the optimization approach.

As a desired sensitivity pattern, for example, there is a pattern in which color differences in combinations that two colors in an object color group (i.e., a color group consisting a plurality of specified colors) are combined (i.e., a color difference between combined two colors) are made small in specific combinations, and are made large in the other specific combinations.

As such a pattern, in more detail, there is a pattern in which, given that the object color group consists of a plurality of colors of a portion to which cosmetics are applied, and a plurality of colors of a portion to which cosmetics are not applied, color differences are respectively made small among the colors of the portion to which cosmetics are applied and the colors of the portion to which cosmetics are not applied, and a color difference is made large between the color of the portion to which cosmetics are applied and the color of the portion to which cosmetics are not applied, and by this pattern, it is made easy to distinguish uneven application of cosmetics.

Further, as a desired sensitivity pattern, there is a pattern in which color differences which a color deficient observer senses for arbitrary combinations that two colors in the object color group are combined, are made large, and by this pattern, a distinction when a color deficient observer distinguishes the respective colors in the object color group is made easy.

Further, by using color differences which a color deficient observer senses for arbitrary combinations that two colors in the object color group are combined, as a desired sensitivity pattern, difficulty when a color normal observer distinguishes the respective colors in the object color group is made close to the level of difficulty of a color deficient observer, which makes it difficult for the color normal observer to distinguish the respective colors in the object color group difficult.

The method for forming a transmission type functional spectral filter can be applied to a method for forming a reflection type (mirror type) functional spectral filter having the following structures.

A method for forming a reflection type (i.e., mirror type) spectral filter having a multilayer film on a surface of an opaque base material (including a transparent base material having a light-blocking layer on its rear surface side), or between a transparent base material and a light-blocking layer provided on a rear surface side of the transparent base material, and the method includes the steps of $$M(\lambda)=M(p_1, p_2, \ldots, p_n)$$

describing a spectral reflectance $M(\lambda)$ of the multilayer film as $M(\lambda)=M(p_1, p_2, \ldots, p_n)$ by using parameters $p_1, p_2, \ldots,$ and $p_n$ composed of divided wavelength intervals and reflectances corresponding to the respective wavelength intervals, or function parameters $p_1, p_2, \ldots,$ and $p_n$ when reflectances at a given wavelength are represented as a function model, optimizing the parameters $p_1, p_2, \ldots,$ and $p_n$ such that a sensitivity difference pattern formed from sensitivity differences (i.e, color differences) in a sensitivity wavelength band of a light receiving member via a reflection of the multilayer film between combined two colors for arbitrary combinations that two colors in an object color group consisting of a plurality of specified colors are combined, is made into a desired sensitivity difference pattern, and forming the reflection type spectral filter on the basis of an optimum $M(\lambda)$ described by using the optimized parameters $p_1, p_2, \ldots,$ and $p_n$.

The optimum $M(\lambda)$ is preferably found in accordance with an algorithm as follows.

When a number of colors in the object color group in an object to be observed is N, after spectral reflectances $R_i(\lambda)$ (i=1 to N) of the object color group and a spectral distribution $E(\lambda)$ of an illumination light are set, the following (O), (I), (II), and (III) are repeated in this order until the performance evaluated value A is maximized, and $M(\lambda)$ when the performance evaluated value A is maximized is regarded as the optimum $M(\lambda)$.

(O) The spectral reflectance $M(\lambda)$ is initialized by setting an initial value to the respective parameters the first time, and the spectral reflectance $M(\lambda)$ is set by resetting the respective parameters on the basis of an optimization approach on and after the second time.

(I) $C_i=f_1(M(\lambda)R_i(\lambda)E(\lambda))$, which is sensitivity (i.e., color sensation) of the respective colors in the object color group when those are observed via a reflection of the functional spectral filter having the spectral reflectance $M(\lambda)$ is calculated.

(II) $\Delta E_{i,j}=f_2(C_i, C_j)$, which are sensitivity differences between combined two colors for arbitrary combinations that two colors in the object color group are combined, on the basis of the sensitivity, is calculated.

(III) A performance evaluated value A at the spectral reflectance $M(\lambda)$ is calculated on the basis of the following formula in which weighting factors $W_{i,j}$ are set such that $M(\lambda)$ becomes the optimum $M(\lambda)$ when A is maximized.

[Formula 2]

When there is a target value (desired sensitivity difference) $\Delta E^t_{i,j}$ for each $\Delta E_{i,j}$ (when there is teacher data), $$A = \sum_{\substack{i,j=1 \\ i<j}}^{N} W_{i,j} f_3(\Delta E_{i,j}, \Delta E^t_{i,j}) \tag{a}$$

when there is no target value for each $\Delta E_{i,j}$ (when there is no teacher data), $$A = \sum_{\substack{i,j=1 \\ i<j}}^{N} W_{i,j} f_{3-1}(\Delta E_{i,j}) \tag{b}$$

The transmission type and reflection type functional spectral filters formed by the above-described methods may be processed so as to 1) be manufactured as spectacles, contact lenses, or intraocular lenses, to be an optical product for eyes (however, only in a case of transmission type filter), 2) be incorporated in a light receiving part of an imaging device such as a camera or a photodiode, to be an optical photographic device, and moreover, 3) be incorporated in a light emitting part of a halogen lamp, a fluorescent lamp, a standard light source, or the like, to be a light source device. As a matter of course, these optical photographic devices and light source devices may be appropriately combined.

Figure 1:
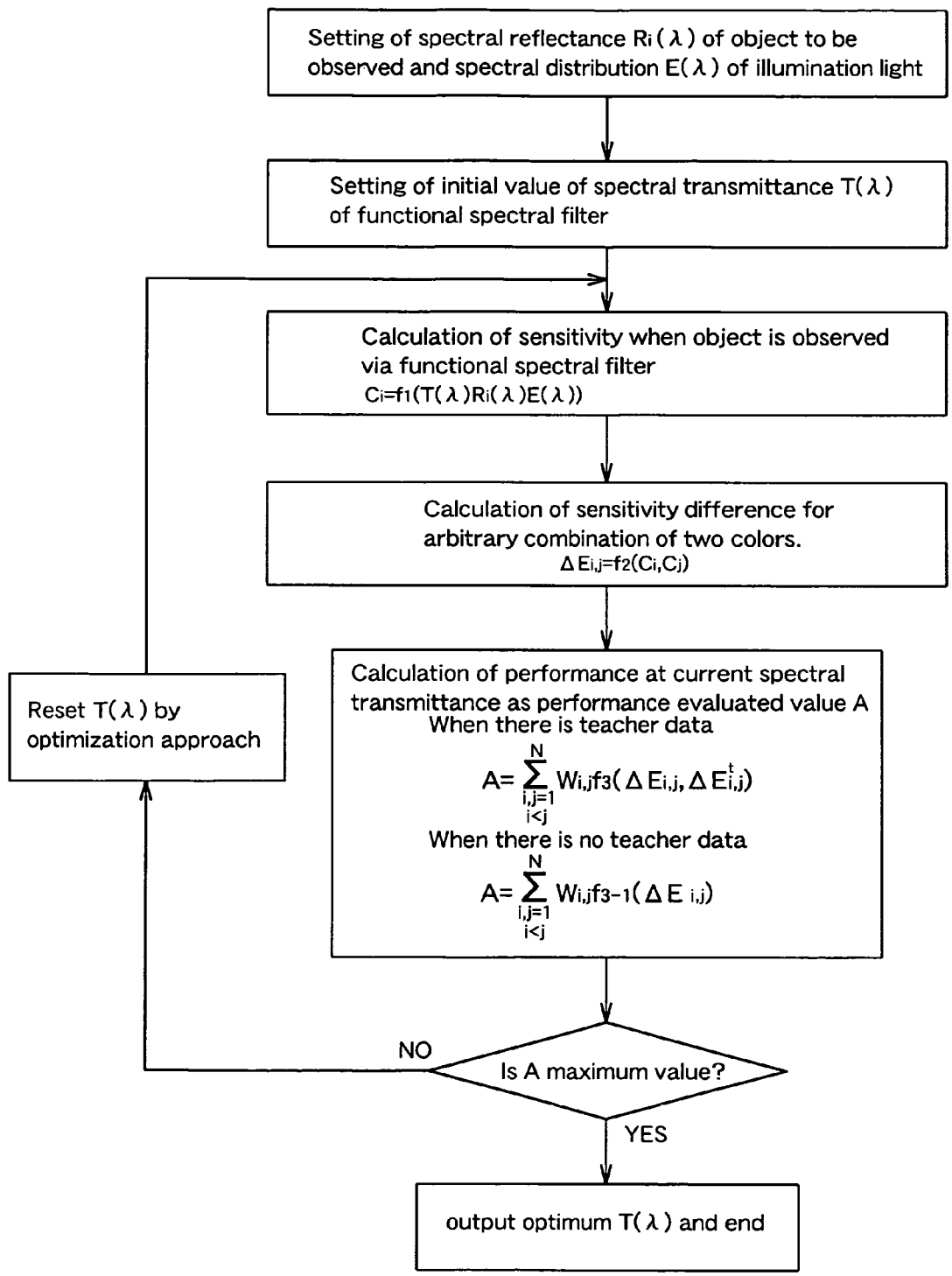
FIG. 1 is a flow sheet showing an algorithm for determining a spectral transmittance in a transmission type functional spectral filter according to the present invention.

REFERENCE NUMERALS 10, 10A Opaque base material
12 Multilayer film
14 Glass base material
16 Light-blocking film (light-blocking layer)

BEST MODE FOR CARRYING OUT THE INVENTION

Hereinafter, an embodiment according to a method for forming a functional spectral filter (hereinafter, simply referred to as "spectral filter") of the present invention will be described.

Transmission type and reflection type functional spectral filters according to the present invention can be used as various types of tools.

The term "tools" here means spectral filters disposed in light receiving parts (light receiving members) in front of, at rear surfaces, or inside imaging devices such as cameras, photodiodes, and monochrome cameras, or spectral filters disposed in light emitting units in front of, at rear surfaces, or inside optical systems such as televisions, monitors, and various light sources, and further, in cases of transmission type spectral filters, the term "tools" means products for eyes such as spectacle lenses, contact lenses, and intraocular lenses, which are not particularly limited, and for example, a case of only a glass plate, a plastic plate, or the like is included.

A spectral filter according to the present invention presupposes having a multilayer film (a multilayer thin film) on an upper surface of a transparent base material or an opaque base material (including a transparent base material having a light blocking layer on its rear surface side), or between a transparent base material and a light blocking layer.

The term "transparent" of the "transparent base materials" here may be sufficient to have an optical transmittance to an extent that it is possible to achieve an object of the present invention, which includes not only "transparent and colorless," but also "colored transparent," and even "translucent."

Further, as a "transparent base material," for example, the following inorganic glasses (i) or organic glasses (ii) may be used.

(i) Soda-lime glass, borosilicate glass, crown glass, flint glass, barium crown glass, barium flint glass, lanthanum crown glass, lanthanum flint glass, and the like.

(ii) Acrylic series, polycarbonate series, polysulphone series, polythiourethane series, diethylene glycol bis (allyl carbonate) series, polyester series, cellulose series, and the like.

Further, as an opaque base material, metal base materials, plastic base materials, ceramic base materials, and paper base materials, which are capable of blocking transmitted light and which have surfaces on which multilayer film can be formed, which are not particularly limited. Note that a color of a base material at this time is not particularly limited. This is because it is possible to eliminate the effect of a color of a base material by the multilayer design. Further, as in the examples which will be described later, by using a glass base material whose rear surface is made into a ground glass state and in which a light blocking film is formed thereon as an opaque base material, a multilayer film may be formed on the surface of the opaque base material, or a light blocking film may be provided on the rear surface side of a transparent base material, and a multilayer film may be formed between the light blocking film and the transparent base material, that is, on the light blocking film.

As a combination of thin film materials forming the multilayer film, in a case of a multilayer film, thin film materials with refractive indexes at which it is possible to make smaller or to make larger an optical transmittance or reflectance are not particularly limited, and for example, (i) inorganic oxides (metal oxides), (ii) inorganic halides (metal halides), and (iii) simple metal as follows may be used.

(i) Oxides of titanium, tantalum, zirconium, niobium, antimony, yttrium, indium, tin, lanthanum, magnesium, aluminum, hafnium, neodymium, silicon, zinc, iron, and the like, or composite oxides containing a plurality of those.

(ii) Halides of magnesium, natrium, lanthanum, aluminum, lithium, and the like.

(iii) Simple substances such as silicon, germanium, gold, silver, copper, nickel, platinum, and iron, or mixtures containing a plurality of those (including alloys and sintered compacts).

The above-described multilayer film can be formed by a general-purpose thin film forming technique such as dry plating (PVD) or wet plating (CVD), such as a vacuum evaporation method, an ion assisted deposition method, sputtering, ion plating, and the like.

Then, a spectral transmittance T ($\lambda$) of the multilayer film is described as:

$$T(\lambda)=T(p_1, p_2, \ldots, p_n)$$

by using parameters $p_1, p_2, \ldots$, and $p_n$ composed of divided wavelength intervals and transmittances corresponding to the respective wavelength intervals, or function parameters $p_1, p_2, \ldots$, and $p_n$ when transmittances at a given wavelength are represented as a function model, and the parameters $p_1, p_2, \ldots$, and $p_n$ are optimized such that a sensitivity difference pattern formed from sensitivity differences (i.e, color differences) in a sensitivity wavelength band of a light receiving member via the multilayer film between combined two colors for arbitrary combinations that two colors in an object color group consisting of a plurality of specified colors are combined, is made into a desired sensitivity difference pattern, and the transmission type spectral filter is formed on the basis of an optimum T($\lambda$) described by using the optimized parameters $p_1, p_2, \ldots$, and $p_n$.

Here, the light receiving member is a retina cell in a human eye, and a photodetector unit in a photographic machine.

Further, the sensitivity wavelength band is a visible light wavelength band (visible part) (approximately 380 to 780 nm) in a human eye, and in a photographic machine or the like, it ranges from an ultraviolet part (lower limit: approximately 1 nm) whose wavelength is shorter than that of the visible part, to an infrared part (upper limit: approximately 1 mm) whose wavelength is longer than that of the visible part.

Then, the functional spectral filter according to the present invention is characterized by that, when an object is viewed through a tool (i.e., via a multilayer film), for arbitrary combinations that two colors in an object color group consisting of a plurality of colors randomly specified are combined, color differences in the respective combinations are made close to a well-known color difference value in advance (which corresponds to a case in which there is teacher data), or color differences in specific combinations are made small or made large (which corresponds to a case in which there is no teacher data).

Next, an algorithm (calculation procedure) to determine an optimum $T(\lambda)$ in the present invention will be described in accordance with a flow sheet shown in FIG. 1.

First, it is assumed that spectral distribution intensity of illumination light with which an object to be observed is irradiated, such as sunlight, fluorescent light, or incandescent light, at a wavelength of $\lambda$ is $E(\lambda)$, and a spectral reflectance of the object to be observed at a wavelength of $\lambda$ is $R(\lambda)$. Then, a plurality of colors are specified so as to correspond to colors of portions to be observed. Here, a number of colors N to be specified (where N is a natural number of 2 or more) can be appropriately selected within a range from 2 to 2000 in accordance with a design aim (required precision). However, the number of colors N is preferably, for example, 10 to 20 considering precision and computational speed within a range which can be calculated by a general-purpose personal computer.

Therefore, the spectral distribution intensity of a reflected light provided from the object to be observed is represented by $R_i(\lambda)E(\lambda)$. Here, $R_i(\lambda)$ is a spectral reflectance of a color area of a color signal (color number) i (i=1 to N); i is a natural number) at a wavelength of $\lambda$ of the object to be observed.

Figure 2:
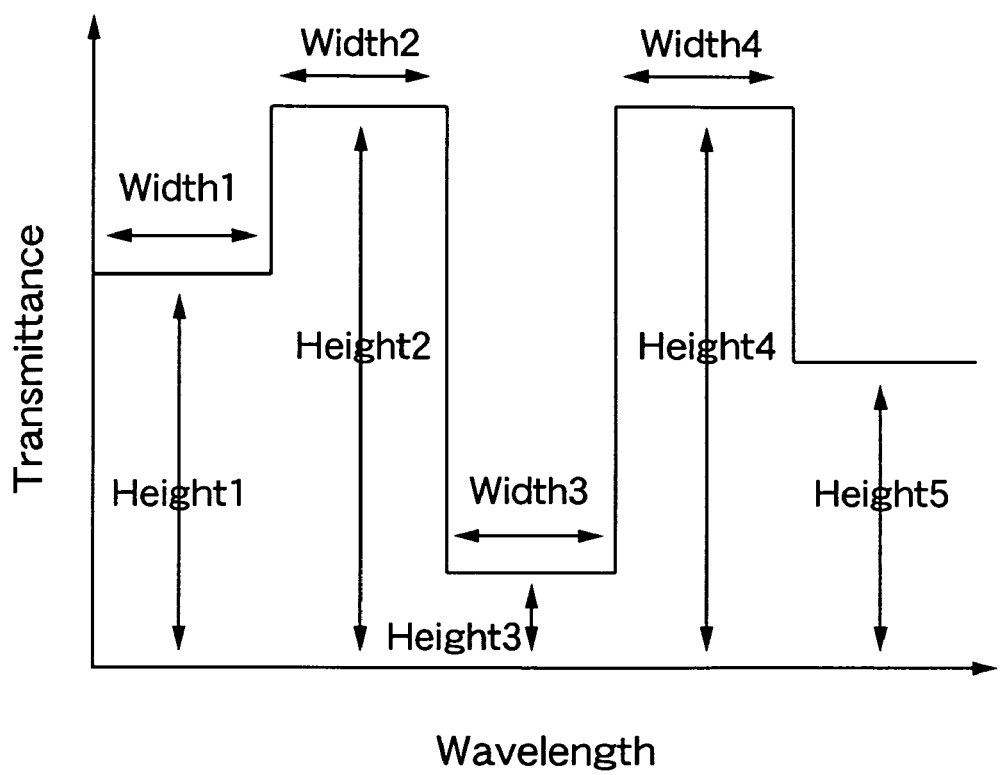
FIG. 2 is a diagram of a model as the spectral filter used in an example 1.

Next, a spectral transmittance $T(\lambda)$ of the spectral filter is described with a small number of parameters $\{p_1, p_2, \ldots,$ and $p_n\}$ composed of transmittances and wavelength intervals (refer to FIG. 2).

Here, the number of parameters n is greater than or equal to 1 (n=1 is only for transmittance), and is appropriately selected in accordance with a design aim (required precision). Note that an upper limit as the number of parameters is not particularly limited, and for example, and given that a photosensitive wavelength band is a visible light part (380 to 780 nm) and a wavelength interval (level width) is 1 nm, and a step function (refer to FIG. 2) is used, the number of parameters which is three-digit numbers or more, such as 799 (wavelength intervals: 399, transmittances: 400) may be possible. However, an enormous calculation amount is required in order to obtain an optimum $T(\lambda)$, which is unpractical. The number of parameters is set to the number of parameters which can be calculated by a general-purpose personal computer in the same way as described above, and in consideration of precision and computational speed, the number n is preferably, for example, 4 to 20, and more preferably 6 to 15.

Then, the color spectral distribution at the area of the color signal (color number) i when the object to be observed is observed through the spectral filter having the spectral transmittance $T(\lambda)$ becomes $T(\lambda)R_i(\lambda)E(\lambda)$.

Note that the spectral transmittance $T(\lambda)$ has been calculated by using the step function as shown in FIG. 2 in an example 1. However, the spectral transmittance $T(\lambda)$ may be calculated by using a spline function as in examples 2 to 4, and further, by using a sigmoid function. Where the sigmoid function is a function showing a sequential model, for example, given that the number of parameters is three of $p_1$, $p_2$, and $p_3$, it is described as $f(x)=p_3/[1+\exp(p_1 \cdot x+p_2)]$.

Given that the sensitivity obtained when a color spectral distribution $T(\lambda)R_i(\lambda)E(\lambda)$ in a color of a color number is made to pass through a given detector, for example, a given photoreceiver (light receiving member) such as eyes, a camera, a photodiode, or the like (i.e., the sensitivity for the color of the color number i) is $C_i$, $C_i=f_1(T(\lambda)R_i(\lambda)E(\lambda))$.

When an observer is a person (that is, the light receiving member is one's eyes), a function $f_1$ used for calculating the sensitivity $C_i$ can be represented by use of a well-known function representing a color. For example, the CIE94 color coordinate system, the XYZ color coordinate system defined in JIS Z 8701, the L*a*b* color coordinate system and the L*u*v* color coordinate system defined in JIS Z 8729, or the color coordinate systems represented by Yxy, Yu'v', RGB, CMYK, HVC, and the like can be used.

Further, in a case of a photoreceiver such as a camera or a photodiode, values such as an electric current value, a temperature, a light quantity, and the like can be used in order to calculate the sensitivity $C_i$. However, values are not limited to these values, and various types and a variety of values may be used.

For all arbitrary combinations of sensitivities $C_i$ and $C_j$ for colors of color numbers i and j, a color difference $\Delta E_{i,j}$ is calculated by the following formula.

$$\Delta E_{i,j}=f_2(C_i,C_j)(i,j=1,\ldots,N; i<j) \qquad \text{[Formula 3]}$$

When an observer is a person, a function $f_2$ used for calculating a color difference can be represented by use of a well-known function representing a color difference, and for example, the CIE94 color-difference formula (Formula 8 which will be described later) recommended by the CIE (Commission Internationale de l'eclairage) is used from the standpoint of precision. However, the CIE1976 color-difference formula (JIS Z 8730) may be used.

Further, in a case of a photoreceiver such as a camera or a photodiode, a difference between voltages and electric currents serving as output, a square value of a difference, or an absolute value of a difference may be used.

Hereinafter, a case (i) in which there is teacher data (target value) and a case (ii) in which there is no teacher data will be separately described.

(i) Case in Which There is Teacher Data

An evaluated value $e_{i,j}$ denoting how much a color difference value $\Delta E_{i,j}$ when an object is viewed via the filter is approximate to a well-known color difference value (target value) $\Delta E'_{i,j}$ is represented by $$e_{i,j}=f_3(\Delta E'_{i,j},\Delta E_{i,j}) \qquad \text{[Formula 4]}.$$

For a function $f_3$, a square value of a difference between these two color difference values, an absolute value of the difference, or a value that a negative sign is added to a relative error value, or a correlation value may be used. However, functions by which an evaluated value is made greater when these two color difference values are similar to one another, are not particularly limited.

A value represented by $$A = \sum_{i,j=1}^{N} W_{i,j}e_{i,j}(i<j) \qquad \text{[Formula 5]}$$

in which the evaluated value $e_{i,j}$ has been multiplied by a given weighting factor $W_{i,j}$, and those have been summed up, is a performance evaluated value A denoting a performance of the spectral filter.

With respect to a weighting factor, for example, in a case of a color vision compensation filter, provided that a weight (weighting) is made larger for a color combination more difficult for a color deficient observer to distinguish its colors, it is made easy to design an optimum $T(\lambda)$ with a high regard for the color combination more difficult to distinguish its colors. That is, in formula 5, it is recommended that a value of $W_{i,j}$ be made greater particularly for a color combination with a high regard for its reproducibility.

(ii) Case in Which There is No Teacher Data

In a case in which there is no teacher data, an evaluated value $e_{i,j}$ is represented by $e_{i,j}=f_{3-1}(\Delta E_{i,j})$.

Here, $\Delta E_{i,j}$ is a color difference value when an object is viewed via the filter. As a function $f_{3-1}$, a square value of a color difference value, an absolute value of the color difference value, or a correlation value between the color difference value and a well-known color difference value may be used. However, functions by which an evaluated value $e_{i,j}$ is made greater when $\Delta E_{i,j}$ is greater, are not particularly limited.

A performance evaluated value A in a case in which there is no teacher data is set to a value represented by the above-described formula 5. In formula 5, it is recommended that $W_{i,j}<0$ for a color combination in which an attempt is made to make small a difference between colors, and $W_{i,j}>0$ for a color combination in which an attempt is made to make large a difference between colors.

An example in which specified colors are three colors (N=3) in a case in which there is no teacher data will be described.

Sensitivity differences among sensitivities $C_1$, $C_2$, and $C_3$ of respective color numbers 1, 2, and 3 are denoted by $\Delta E_{1,2}$, $\Delta E_{2,3}$, and $\Delta E_{1,3}$. Here, in order for the colors of the color numbers 1 and 2, and 2 and 3 to appear as different as possible, differences between the respective sensitivities $C_1$ and $C_2$, and $C_2$ and $C_3$, i.e., $\Delta E_{1,2}$ and $\Delta E_{2,3}$ when those are observed via the filter are made large, and in order for the colors of the color numbers 3 and 1 to appear as close as possible, a sensitivity difference $\Delta E_{1,3}$ between the $C_3$ and $C_1$ is made small.

If the respective sensitivities are denoted by the L*a*b* color coordinate system regulated in the CIE1976, those are $C_1=(L_1^*, a_1^*, b_1^*)$, $C_2=(L_2^*, a_2^*, b_2^*)$, and $C_3=(L_3^*, a_3^*, b_3^*)$. When the evaluated values $e_{1,2}$, $e_{2,3}$, and $e_{1,3}$ between the respective color numbers are calculated by use of a general color-difference formula by using these sensitivities, those are;

$$e_{1,2}=[(L_2^*-L_1^*)^2+(a_2^*-a_1^*)^2+(b_2^*-b_1^*)^2]^{1/2}$$

$$e_{2,3}=[(L_3^*-L_2^*)^2+(a_3^*-a_2^*)^2+(b_3^*-b_2^*)^2]^{1/2}$$

$$e_{1,3}=[(L_3^*-L_1^*)^2+(a_3^*-a_1^*)^2+(b_3^*-b_1^*)^2]^{1/2}.$$

Further, a performance evaluated value A denoting a performance of the filter is represented by the following formula.

$$A=W_{1,2} \cdot e_{1,2}+W_{2,3} \cdot e_{2,3}+W_{1,3} \cdot e_{1,3}$$

Here, because it is recommended that $W_{i,j}<0$ for a color combination in which an attempt is made to make small a difference between colors, and $W_{i,j}>0$ for a color combination in which an attempt is made to make large a difference between colors, given that $W_{1,2}=+1$, $W_{2,3}=+1$, and $W_{1,3}=-1$, $$A=e_{1,2}+e_{2,3}-e_{1,3}, \text{ is formed, and}$$

when $e_{1,2}$ and $e_{2,3}$ are made large, A is made large, and when $e_{1,3}$ is made small, A is made small. Accordingly, when A is a maximum value, $e_{1,2}$ and $e_{2,3}$ are made large, and $e_{1,3}$ is made small, i.e., $\Delta E_{1,2}$ and $\Delta E_{2,3}$ are made large, and $\Delta E_{1,3}$ is made small.

A performance evaluated value A defined by formula 5 is described as a function with parameters $p_1, p_2, \ldots, p_n$ of $T(\lambda)$ denoting a spectral transmittance characteristic of the spectral filter. Therefore, in order to determine the parameters $p_1, p_2, \ldots, p_n$ with which a performance evaluated value A is maximized under the constraint condition $0 \leq T(\lambda) \leq 1$ for designing a transmittance of the spectral filter, A is described by the following formula 6.

$$A(T(\lambda: p_1, p_2, \ldots, p_n)) \text{ provided that } 0 \leq T(\lambda) \leq 1, \quad \text{[Formula 6]}$$

As constraint conditions, not only $0 \leq T(\lambda) \leq 1$, but also, for example, a condition such as "an average spectral transmittance is greater than or equal to 50%," "a visibility transmittance is greater than or equal to 30%," or the like may be provided, which are not particularly limited.

Here, in order to determine parameters $p_1, p_2, \ldots,$ and $p_n$ with which the above-described performance evaluated value A is maximized, it is necessary to minimal-change respective $p_i$ (i=1 to n) to determine the respective $p_i$ with which the A is made large as soon as possible. For example, minimal-changes such that a variation in wavelength intervals is 5 nm or less, and a variation in transmittance is 1% or less are performed many times, to determine respective $p_i$ with which the A is made large as soon as possible. An optimization approach to determine a spectral transmittance $T(\lambda)$ (i.e., an optimum $T(\lambda)$) at which a performance evaluated value A is maximized is not particularly limited. For example, it is possible to determine parameters by using a simulated annealing method (hereinafter called "SA method"), which is one type of stochastic optimization approach (refer to Reference Document (3)).

The SA method is one method for optimizations, which is an annealing method developed for performing cooling control waiting for having an optimum molecular grouping in an annealing process, which is simulated on a computing machine. The term "simulated annealing method" is a method in which a substance in a melting condition at high temperature is gradually cooled down, which provides a low-energy state such as a less-defective crystal.

In a case of the SA method (Reference Document (3)), a predetermined number of optimizations is appropriately selected from a range of 100 times to 100000 times in accordance with a design aim (required precision). Further, as a condition for terminating optimizations, "when an increment in a performance evaluated value A due to optimizations is made less than a given variation, it is judged as a maximum value," "when a performance evaluated value A due to optimizations is made greater than or equal to a certain set value, it is judged as a maximum value," or the like may be exemplified.

In the description in the case of the transmission type spectral filter, if "transmittance" and "$T(\lambda)$" are respectively read as "reflectance" and "$M(\lambda)$," it will be a description in a case of a reflection type spectral filter.

Figure 9:
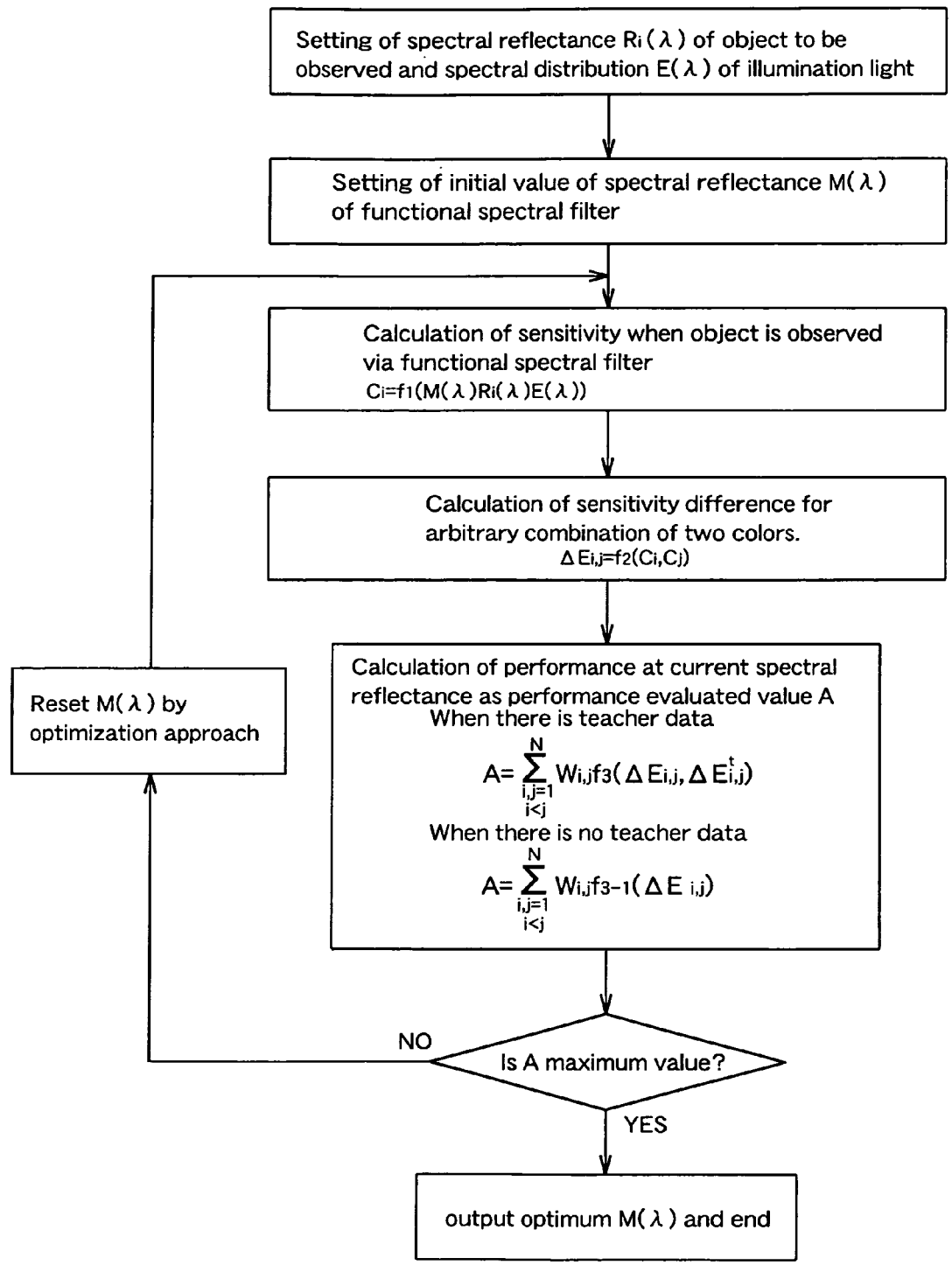
FIG. 9 is a flow sheet showing an algorithm for determining a spectral reflectance of a reflection type spectral filter according to the present invention.

FIG. 9 is a flow sheet showing an algorithm for determining a spectral reflectance in a reflection type spectral filter, and FIG. 9 corresponds to FIG. 1 which is a flow sheet showing an algorithm for determining a spectral transmittance in a transmission type spectral filter.

In accordance with the functional spectral filter according to the present invention, not only is it possible for a color normal observer or a photoreceiver to experience color sensitivity of a color deficient observer, but it is also possible to control color sensitivity of an observer in accordance with a purpose by appropriately setting parameters and a function for the above-described design approach. Therefore, the functional spectral filter according to the present invention can be expected to be applied to the following various tools (means).

1) Tools Corresponding to Color Deficiency (Mainly, a Transmission Type Spectral Filter is Applied to these Tools):

a tool through which it is possible to make it easy to distinguish colors with respect to a color scheme originally difficult to be distinguished by a color deficient observer wearing it; a tool through which it is possible for a color normal observer to understand the inconveniences of a color deficient observer, and further, which performs a checking function in the process of switching to a color scheme giving consideration to a color deficient observer; a tool through which it is possible to easily distinguish colors with respect to a color scheme difficult to be distinguished by an observer having a lenticular cataract common among older people; a tool through which it is possible for a color normal observer to understand the inconveniences of an observer having a lenticular cataract, and the like.

2) Tools Corresponding to Cosmetics Field:

a tool for checking uneven application simply due to a difference between spectral characteristics at the time of applying makeup to one's skin; a tool for checking makeup removal at the time of wiping the skin or perspiring after applying makeup to one's skin; a tool for checking remaining makeup after removing one's makeup; a tool for checking a skin condition after face-washing, giving facial treatment, whitening, and the like; a tool for improving beauty of a skin condition and a skin condition after applying makeup to one's skin, and the like.

3) Tools Corresponding to Medical Field:

(i) a tool for testing simply due to a difference between spectral characteristics at the time of detecting blood contained in urine or a stool;

(ii) a tool for evaluating a health level, and a tool capable of simply distinguishing between normal tissues and abnormal tissues on the basis of a hue shift at the time of testing a body's interior with a medical endoscope;

(iii) a tool capable of simply distinguishing those on the basis of a hue shift at the time of testing carious teeth at an early stage, plaque buildup, and unpolished areas, and a tool through which it is made easy to select dentures according to colors of teeth of a patient, and the like;

(iv) a tool capable of simply judging those by highlighting a difference in hue or shifting a hue at the time of testing red-eyes or dry eyes, or foreign bodies' entered state, and the like.

4) Tools Corresponding to Agricultural Field:

(i) a tool through which it is possible to simply judge the degree of ripeness on the basis of a surface color of a fruit/vegetable or a light transmitted through the inside thereof;

(ii) a tool through which it is possible to simply sense stress of a plant influenced by the environment such as the atmosphere or the earth on the basis of a surface color of the plant or a light transmitted through the inside thereof, and the like.

5) Tools Corresponding to Security Field:

a tool through which it is possible to realize a system having a function capable of recognizing display contents only through the tool on measuring instruments or display units of personal computers and the like, and capable of maintaining confidentiality thereof from a third party, and the like.

6) Tools Corresponding to Engineering Field:

a tool through which it is possible to simply detect uneven application at the time of detecting uneven application on an automobile for example, a tool through which it is made easy to detect foreign objects at the time of detecting and removing foreign objects mixed in food products in a food factory, and the like.

EXAMPLE 1

The present example relates to a method for forming a filter through which it is possible to understand inconveniences in distinguishing colors for a color deficient observer, but also which can be introduced in a workflow in a practical work.

16 colors in a D-15 color rendering-index (N=16) commonly used for color vision tests have been regarded as colors of an object to be observed (specified colors, i.e., an object color group), and a D-65 serving as a standard light source has been used as an illumination light.

A visible light wavelength band ($\lambda$=380 to 780 nm) is divided into five intervals as shown in FIG. 2, and by use of a step function consisting of nine parameters (of widths: 4+heights: 5) which are composed of the respective wavelength intervals (widths) and the transmittances (heights) corresponding to the respective wavelength intervals, a spectral filter model is described as $T(\lambda)=T(p_1, p_2, \ldots, p_9)$. These parameter values are limited within a range in which $0 \leq T(\lambda) \leq 1$ is satisfied. Note that $p_1$ to $p_4$ are respectively values of the widths 1 to 4 and $p_5$ to $p_9$ are respectively values of the heights 1 to 5.

Next, the CIE1976L*a*b* color coordinate system is used as a function representing an appearance of colors, and the respective colors are represented as $Ci=(L_i^*, a_i^*, b_i^*)$ [i=1 to 16], and in order to calculate color differences which a color deficient observer senses, a color appearance for the color deficient observer with respect to the color group in the D-65 standard light source is found by use of a technique by a commonly-known document [Reference Document (1)].

For a calculation of color differences, the $\Delta E^*_{94}$(CIE94) which is a color-difference formula taking the nonuniformity in a CIELAB color space into consideration has been used [Reference Document (2)]. For example, a color difference $$\Delta E_{i,j} = f_2(C_i, C_j), \text{ where} \qquad \text{[Formula 7]}$$

$C_i=(L^*_i, a^*_i, b^*_i), C_j=(L^*_j, a^*_j, b^*_j)$
is defined as follows.

$$\Delta E^*_{94} = \left\{ \left(\frac{\Delta L^*}{k_L S_L}\right)^2 + \left(\frac{\Delta C^* ab}{k_C S_C}\right)^2 + \left(\frac{\Delta H^* ab}{k_H S_H}\right)^2 \right\}^{1/2} \qquad \text{[Formula 8]}$$

Here, $\Delta L^*$ means a brightness difference, $\Delta C^*_{ab}$ means a chroma difference, $\Delta H_{ab}^*$ means a hue angle difference, $S_L$ (brightness difference correction factor)=1, $S_C$ (chroma difference correction factor)=1+0.045$C^*_{ab}$, $S_H$ (hue angle difference correction factor)=1+0.015$C^*_{ab}$, $k_L = k_C = k_H = 1$:auxiliary correction factor, and chroma is represented by $C^*_{ab} = (C^*_{ab,i} C^*_{ab,j})^{1/2}$.

In order to find $\Delta C^*_{ab}$, first, $C^*_{ab,i}$ and $C^*_{ab,j}$ are respectively determined as $$C^*_{ab,i} = \{(a^*_i)^2 + (b^*_i)^2\}^{1/2}, C^*_{ab,j} = \{(a^*_j)^2 + (b^*_j)^2\}^{1/2}, \qquad \text{[Formula 9]}$$

and a difference therebetween is given by the following formula.

$$\Delta C^*_{ab} = |C^*_{ab,i} - C^*_{ab,j}| \qquad \text{[Formula 10]}$$

Further, after $\Delta E_{ab}^*$ is determined as $$\Delta E^*_{ab} = \{(\Delta L^*)^2 + (\Delta a^*)^2 + (\Delta b^*)^2\}^{1/2}, \qquad \text{[Formula 11]}$$

$\Delta H_{ab}^*$ is determined by the following formula.
Where, $$\Delta L^* = |L_i^* - L_j^*|$$

$$\Delta a^* = |a_i^* - a_j^*|$$

$$\Delta b^* = |b_i^* - b_j^*|.$$

$$\Delta H^*_{ab} = \{(\Delta E^*_{ab})^2 + (\Delta L^*)^2 - (\Delta C^*_{ab})^2\}^{1/2} \qquad \text{[Formula 12]}$$

As color differences which a color deficient observer senses, it is possible to respectively calculate color differences for the protanopes and the deuteranopes. However, because an object of the present example is to make a color normal observer understand a color combination in which it is difficult for a color deficient observer to distinguish colors, color differences which the protanopes and the deuteranopes sense are compared, and a smaller color difference therebetween is used as a color difference for a color deficient observer. That is, given that color differences which the protanopes and the deuteranopes sense are respectively $\Delta E^{Dp}_{i,j}$ and $\Delta E^{Dd}_{i,j}$, $\Delta E^{D}_{i,j}$ has been determined by the following formula. Note that, when $\Delta E^{Dp}_{i,j} = \Delta E^{Dd}_{i,j}$, naturally, $\Delta E^{Dp}_{i,j} = \Delta E^{Dd}_{i,j} = \Delta E^{D}_{i,j}$.

$$\Delta E^{D}_{i,j} = \begin{cases} \Delta E^{Dp}_{i,j}: \text{ when } \Delta E^{Dp}_{i,j} < \Delta E^{Dd}_{i,j} \\ \Delta E^{Dd}_{i,j}: \text{ when } \Delta E^{Dp}_{i,j} > \Delta E^{Dd}_{i,j} \end{cases}$$ [Formula 13]

Here, an evaluation of the spectral transmittance $T(\lambda)$ is provided on the basis of how much the color difference $\Delta E^{D}_{i,j}$ introduced by the formula 13 and the color difference $\Delta E^{F}_{i,j}$ when a color normal observer views the object via the filter having the spectral transmittance $T(\lambda)$ are approximate to one another. At this time, because a weighting factor $W_{i,j}$ for the respective color combinations is required to attach further weight to reproducibility of a color combination in which a color difference which a color deficient observer senses is less, and which is more difficult to distinguish its colors, $$W_{i,j} = 1/(\Delta E^{D}_{i,j} + \epsilon)$$ [Formula 14]

is formed. Here, $\epsilon$ is a positive decimal number for preventing divergence in calculation (zero divide), which is, here, machine epsilon ($\epsilon = 2.2204e^{-16}$) for a calculator in which the present technique is mounted. Further, an evaluated value $e_{i,j}$ of the formula 4 has been formed as $$e_{i,j} = f_3(\Delta E^{D}_{i,j}, \Delta E^{F}_{i,j}) = -|\Delta E^{D}_{i,j} - \Delta E^{F}_{i,j}|.$$ [Formula 15]

Therefore, the performance evaluated value A can be represented as the following formula 16 with a sum of relative error values of $\Delta E^{D}_{i,j}$ and $\Delta E^{F}_{i,j}$, $$A = \sum_{i,j=1}^{N=16} W_{i,j} e_{i,j} = -\sum_{i,j=1}^{N=16} \frac{|\Delta E^{D}_{i,j} - \Delta E^{F}_{i,j}|}{\Delta E^{D}_{i,j} + \varepsilon} (i < j)$$ [Formula 16]

In the present example, in the calculation procedure (algorithm) shown in FIG. 1, an SA method is used as an optimization approach.

Note that, as initial values, $p_1$, $p_2$, $p_3$ and $p_4$ are all set to 80 nm, and $p_5$, $p_6$, $p_7$, $p_8$, and $p_9$ are all set to 50%, and as amounts of minimal-changes, a variation in wavelength intervals is set to 5 nm, and a variation in transmittances is set to 1%.

Then, an increment of A is calculated every 100 times of a number of optimizations, and when a rate of to make larger in A is made less than 1%, a greatest value as A thereamong is regarded as a maximum value (a number of optimizations: 10000 times).

Figure 3:
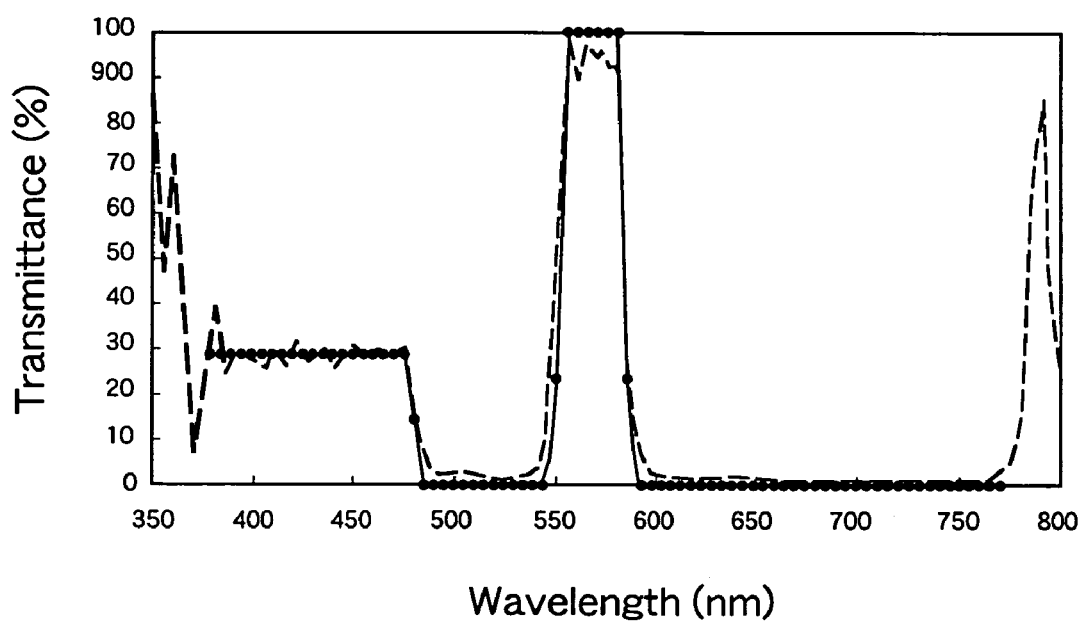
FIG. 3 is a graph chart showing spectral transmittances (solid line) obtained by optimizations and spectral transmittances (dotted line) obtained by film design simulation in the example 1.

The obtained spectral transmittance (optimum $T(\lambda)$) is shown by the solid line in the graph of FIG. 3. Additionally, a film forming simulation in which $SiO_2$ and $TiO_2$ are laminated has been carried out, and it has been confirmed that it is possible to physically realize a characteristic approximate to the theoretical design. The characteristic obtained by this film forming simulation is shown by the dotted line in the graph of FIG. 3.

The film configuration at this time has a total of 31 layers, which are alternate layers of $SiO_2$ and $TiO_2$. Thereafter, a film formation has been carried out by a vacuum evaporation system for practical purposes, and it has been confirmed that it is possible to obtain a characteristic substantially approximate to that by the film forming simulation. Note that the film configuration is determined by use of a well-known film designing software ("Film Star" by FTG Software Associates, USA) to obtain a desired spectral transmittance, which is shown in Table 1.

TABLE 1

| Layer No. | Thin film material | EXAMPLE 1 Physical film thickness | EXAMPLE 2 Physical film thickness |
|---|---|---|---|
| 1 | $SiO_2$ | 110 nm | 85 nm |
| 2 | $TiO_2$ | 80 nm | 90 nm |
| 3 | $SiO_2$ | 110 nm | 25 nm |
| 4 | $TiO_2$ | 75 nm | 45 nm |
| 5 | $SiO_2$ | 125 nm | 80 nm |
| 6 | $TiO_2$ | 80 nm | 65 nm |
| 7 | $SiO_2$ | 110 nm | 90 nm |
| 8 | $TiO_2$ | 75 nm | 50 nm |
| 9 | $SiO_2$ | 110 nm | 45 nm |
| 10 | $TiO_2$ | 65 nm | 90 nm |
| 11 | $SiO_2$ | 120 nm | 45 nm |
| 12 | $TiO_2$ | 65 nm | 60 nm |
| 13 | $SiO_2$ | 100 nm | 275 nm |
| 14 | $TiO_2$ | 75 nm | 35 nm |
| 15 | $SiO_2$ | 150 nm | 155 nm |
| 16 | $TiO_2$ | 70 nm | 105 nm |
| 17 | $SiO_2$ | 110 nm | 145 nm |
| 18 | $TiO_2$ | 75 nm | 85 nm |
| 19 | $SiO_2$ | 85 nm | 135 nm |
| 20 | $TiO_2$ | 50 nm | 100 nm |
| 21 | $SiO_2$ | 210 nm | 160 nm |
| 22 | $TiO_2$ | 90 nm | 135 nm |
| 23 | $SiO_2$ | 95 nm | 70 nm |
| 24 | $TiO_2$ | 60 nm | |
| 25 | $SiO_2$ | 210 nm | |
| 26 | $TiO_2$ | 60 nm | |
| 27 | $SiO_2$ | 90 nm | |
| 28 | $TiO_2$ | 75 nm | |
| 29 | $SiO_2$ | 35 nm | |
| 30 | $TiO_2$ | 70 nm | |
| 31 | $SiO_2$ | 115 nm | |

The obtained spectral transmittance has a characteristic in which two regions of a short wavelength region and a middle wavelength region are transmissive. This fact coincides with the result anticipated at the time of regulating a filter model because the protanopes and the deuteranopes have low color distinguishing ability for a combination of red and green.

Figure 4:
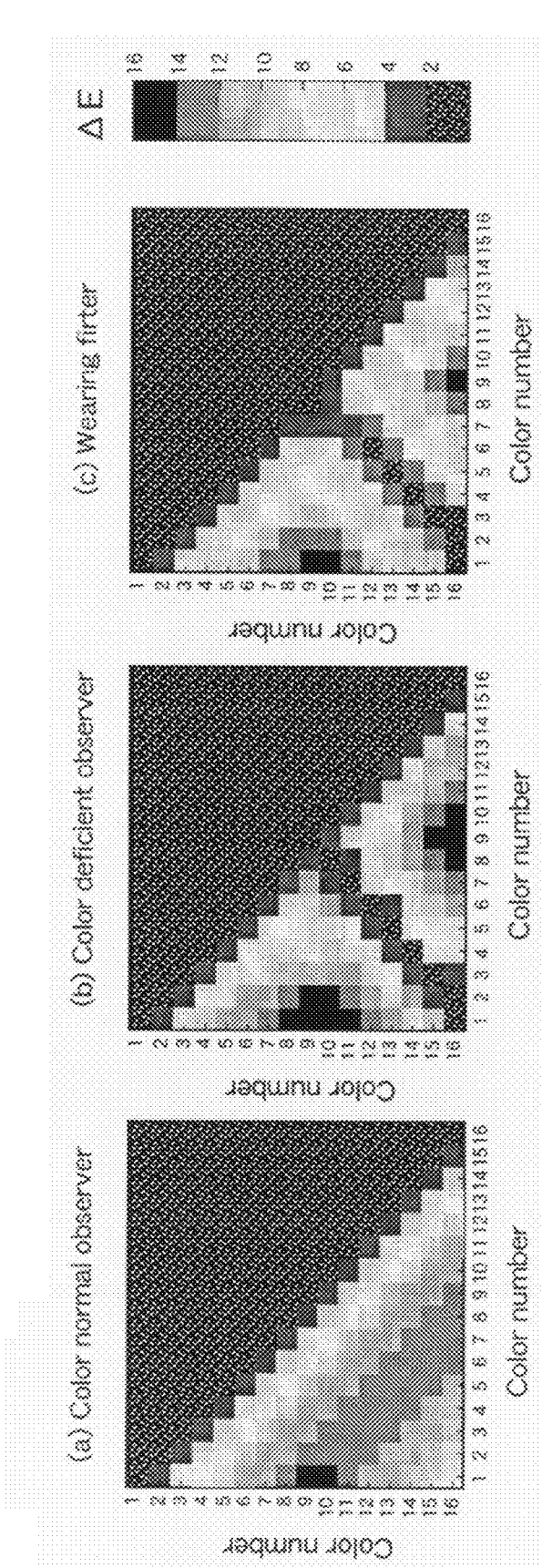
FIG. 4 are charts that indicate color differences for arbitrary combinations of two colors from the D-15 color rendering-index in a simulated manner.

FIG. 4 are charts that indicate color differences of all combinations of two colors from the D-15 color rendering-index in a simulated manner. Color rendering-index numbers (color numbers) i, j are plotted on the ordinate and abscissa, a color difference $\Delta E_{i,j}$ which a color normal observer senses with no filter is shown in FIG. 4(a), a color difference $\Delta E^{D}_{i,j}$ which a color deficient observer senses without a filter is shown in FIG. 4(b), and a color difference $\Delta E^{F}_{i,j}$ which a color normal observer senses wearing a filter is shown in FIG. 4(c). The shaded indications in the respective FIGS. 4(a) to 4(c) respectively correspond to the color differences ($\Delta E$) in the diagram on the right, and shows the fact that the higher the shaded indication is, the higher the color distinguishing ability is.

Here, when FIG. 4(a) and FIG. 4(b) are compared with one another, it can be understood that a color difference which the color deficient observer senses with respect to a specific color combination is less than that of the color normal observer. As shown in FIG. 4(c), since a color difference when the spectral filter is mounted clearly shows this aspect, it can be understood that the designed spectral filter has the desired function.

Figure 5:
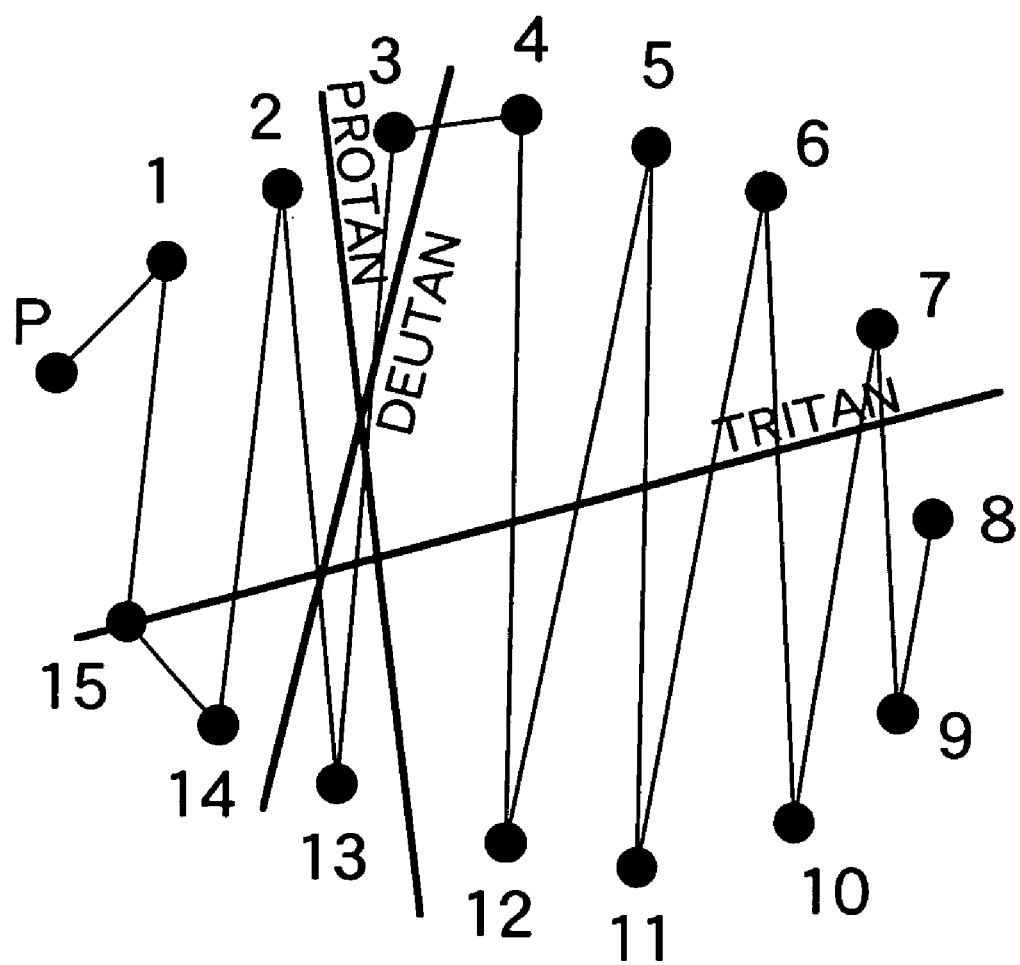
FIG. 5 is a diagram of simulated results of a panel D-15 test.

FIG. 5 is a result of the simulation for the panel D-15 test. In an actual test, under a D65 light source, a subject is made to sort the colors such that colors of 1 to 15 change in the order from a pilot color (P), and the sorted results are connected by lines in numerical order, and are recorded.

It has been confirmed from the test result that the color normal observer has sorted the colors from 1 to 15 in numerical order. FIG. 5 is the result in which the color normal observer wearing the spectral filter has been tested. At this time, it is known that angles of the lines at the time of connecting lines in cases of Protan (a protanope), Deutan (a deuteranope), and Tritan (a tritanope) have respectively resulted in the directions shown in the drawing.

From the test result of FIG. 5, it can be confirmed that color sensitivity in a case in which the spectral filter is worn by the color normal observer wearing the filter is a characteristic intermediate between the protanope and the deuteranope.

EXAMPLE 2

The present example relates to a method for forming a functional spectral filter through which it is possible to make it easy to distinguish specified colors by the color deficient observer wearing the filter.

In the same way as in the example 1, 16 colors in a D-15 color rendering-index (N=16) have been regarded as colors of an object to be observed (i.e., an object color group), and by using a D-65 serving as a standard light source, a color difference $\Delta E^D_{i,j}$ of a color deficient observer has been determined by use of a spline function model with the number of parameters 16

Note that the spline function model used as a spectral transmittance model for the spectral filter is represented by the following formula 17.

$$T(\lambda) = \sum_{k=1}^{16} p_k B_k(\lambda), \text{ where} \quad [\text{Formula 17}]$$

$$B_k(\lambda) = \begin{cases} \left\{ \begin{array}{l} \omega^3 + 3\omega^2(\omega - |\lambda - \lambda_k|) + \\ 3\omega(\omega - |\lambda - \lambda_k|)^2 - \\ 3(\omega - |\lambda - \lambda_k|)^3 \end{array} \right\} / 6\omega^3 : & \text{when } |\lambda - \lambda_k| \leq \omega \\ (2\omega - |\lambda - \lambda_k|)^3 / 6\omega^3 : & \text{when } \omega \leq |\lambda - \lambda_k| \leq 2\omega \\ 0 : & \text{when } 2\omega \leq |\lambda - \lambda_k| \end{cases}$$

Here, a visible light wavelength band 380 to 780 nm is an analysis object, $\lambda_k$ is set so as to range from 350 to 800 nm at intervals of 30 nm, and as ω=6.

In the same way, weighting factors $W_{i,j}$ for arbitrary color combinations are set to;

$$W_{i,j} = 1/(\Delta E^D_{i,j} + \epsilon)$$

so as to make the weight larger for a color combination more difficult for the color deficient observer to distinguish its colors.

Because the present example is a case in which there is no teacher data, a color difference when the color deficient observer views the object via the filter has been set to $\Delta E^F_{i,j}$, and an evaluated value $e_{i,j}$ has been formed as $$e_{i,j} = f_{3-1}(\Delta E_{i,j}{}^F) = \Delta E_{i,j}{}^F. \quad [\text{Formula 18}]$$

Therefore, a performance evaluated value is formed as $$A = \sum_{i,j=1}^{N=16} W_{i,j} e_{i,j} = \sum_{i,j=1}^{N=16} \frac{\Delta E^F_{i,j}}{\Delta E^D_{i,j} + \epsilon} \quad (i<j). \quad [\text{Formula 19}]$$

Here, a maximum value as a performance evaluated value A has been determined by using an SA method in the same way as in the example 1 (a number of optimizations: 10000 times).

Note that initial values of the parameters $p_1, p_2, \ldots,$ and $p_{16}$ are all set to 0.75.

Figure 6:
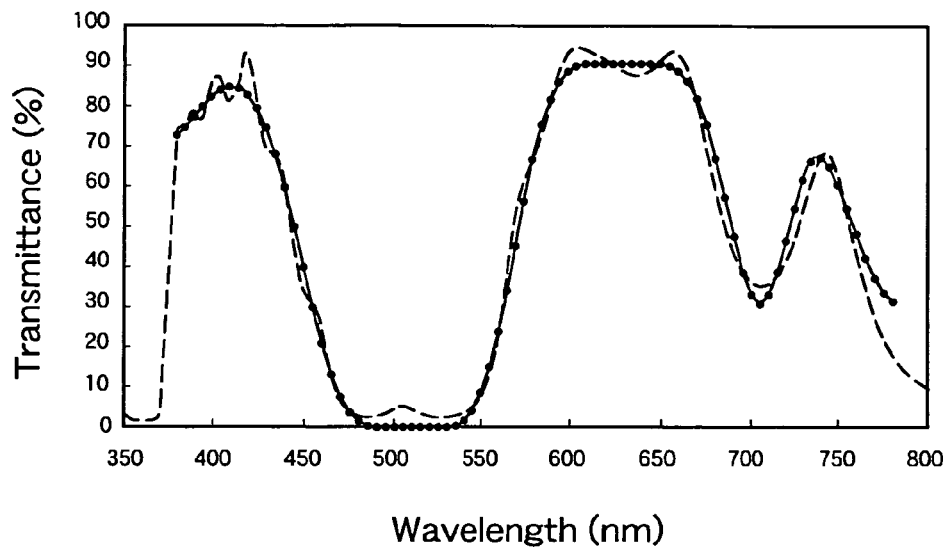
FIG. 6 is a graph showing spectral transmittances (solid line) obtained by optimizations and spectral transmittances (dotted line) obtained by a film forming simulation in an example 2.

The obtained optimum T(λ) is shown by the solid line in the graph of FIG. 6. Additionally, a film forming simulation in which $SiO_2$ and $TiO_2$ are laminated has been carried out, and it has been confirmed that it is possible to physically realize a characteristic approximate to the theoretical design. The characteristic obtained by this film forming simulation is shown by the dotted line in the graph of FIG. 6.

The film configuration at this time has a total of 23 layers which are alternate layers of $SiO_2$ and $TiO_2$. Thereafter, a film has been formed by a vacuum evaporation system for practical purposes, and it has been confirmed that it is possible to obtain a characteristic substantially approximate to that by the film forming simulation.

Note that the film configuration has been determined in the same way as in the example 1, which is shown in Table 1.

EXAMPLE 3

The present example relates to a method for forming a spectral filter through which a difference in a specific color group is enhanced.

As a concrete example for designing a functional spectral filter through which a color difference with respect to a color combination specified in advance is made large or made small, a spectral filter to distinguish between greens of leaves of natural plants and greens of artificial leaves is prepared.

First, given that greens of leaves of natural plants have been set as an A group, greens of artificial leaves have been set as a B group, and a total of six colors of three colors randomly selected respectively from the A group and the B group have been regarded as colors of an object to be observed (that is, an object color group), a spline function model with the number of parameters 23 is used by use of the spectral distributions of the respective reflected lights.

Because the present example is a case in which there is no teacher data, a color difference at the time of viewing the object via the filter has been set to $\Delta E^F_{i,j}$, and an evaluated value $e_{i,j}$ has been formed as $$e_{i,j} = f_{3-1}(\Delta E_{i,j}{}^F) = \Delta E_{i,j}{}^F. \quad [\text{Formula 20}]$$

Therefore, a performance evaluated value A is formed as the following formula.

$$A = \sum_{i,j=1}^{N=6} W_{i,j} e_{i,j} = \sum_{i,j=1}^{N=6} W_{i,j} \Delta E_{i,j}^{F} (i < j) \quad \text{[Formula 21]}$$

Here, in order to make smaller a color difference with respect to the colors in the same color group, and to make larger a color difference with respect to the colors in the different color groups, that is, in order to respectively to make smaller color differences between the colors in the group A and between the colors in the group B, and to make larger a color difference between the color of the group A and the color of the group B, $W_{i,j}$ is set to $$W_{i,j} = \begin{cases} +1: & i \text{ and } j \text{ are different color group} \\ -1: & i \text{ and } j \text{ are the same color group} \end{cases} \quad \text{[Formula 22]}$$

Note that the spline function model used as a spectral transmittance model for the spectral filter is represented by formula 23.

$$T(\lambda) = \sum_{k=1}^{23} p_k B_k(\lambda) \text{ where} \quad \text{[Formula 23]}$$

$$B_k(\lambda) = \begin{cases} \begin{Bmatrix} \omega^3 + 3\omega^2(\omega - |\lambda - \lambda_k|) + \\ 3\omega(\omega - |\lambda - \lambda_k|)^2 - \\ 3(\omega - |\lambda - \lambda_k|)^3 \end{Bmatrix} / 6\omega^3 : & \text{when } |\lambda - \lambda_k| \le \omega \\ (2\omega - |\lambda - \lambda_k|)^3 / 6\omega^3 : & \text{when } \omega \le |\lambda - \lambda_k| \le 2\omega \\ 0: & \text{when } 2\omega \le |\lambda - \lambda_k| \end{cases}$$

Where 380 to 780 nm is an analysis object, $\lambda_k$ is set so as to range from 360 to 800 nm at intervals of 20 nm, and $\omega=4$.

Figure 7:
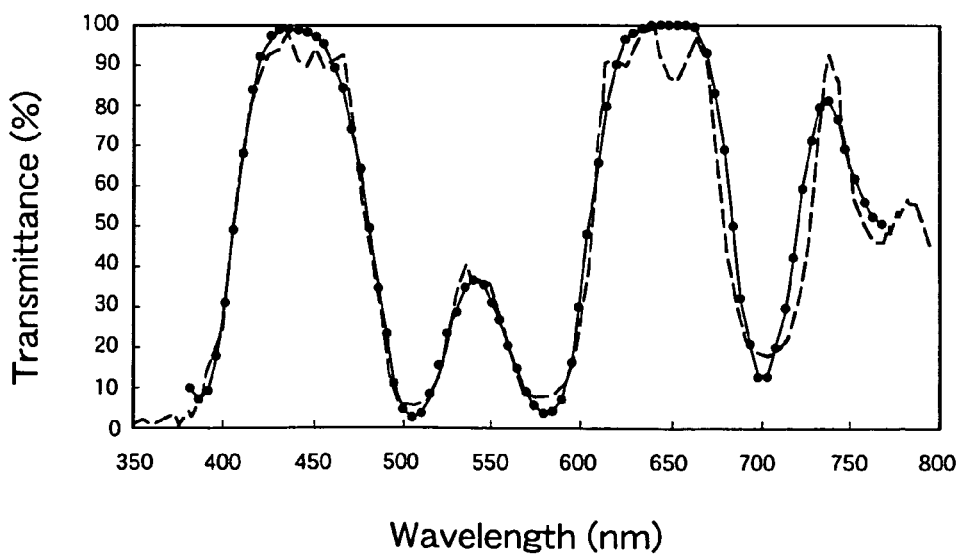
FIG. 7 is a graph showing spectral transmittances (solid line) obtained by optimizations and spectral transmittances (dotted line) obtained by a film forming simulation in an example 3.

Then, optimizations are repeated until the performance evaluated value A of the formula 21 becomes a maximum value, to determine an optimum T ($\lambda$) (a number of optimizations: 15000 times). The obtained optimum T($\lambda$) is shown by the solid line in the graph of FIG. 7.

Note that initial values of the parameters $p_1, p_2 \ldots,$ and $p_{23}$ are all set to 0.75.

Additionally, a film forming simulation in which $SiO_2$ and $TiO_2$ are laminated has been carried out, and it has been confirmed that it is possible to physically realize a characteristic approximate to the theoretical design. The characteristic obtained by this film forming simulation is shown by the dotted line in the graph of FIG. 7. The film configuration at this time has a total of 26 layers, which are alternate layers of $SiO_2$ and $TiO_2$.

Note that the film configuration has been determined in the same way as in the example 1, which is shown in Table 2.

TABLE 2

| Layer No. | Thin film material | EXAMPLE 3 Physical film thickness |
|---|---|---|
| 1 | $TiO_2$ | 85 nm |
| 2 | $SiO_2$ | 140 nm |
| 3 | $TiO_2$ | 15 nm |
| 4 | $SiO_2$ | 25 nm |

TABLE 2-continued

| Layer No. | Thin film material | EXAMPLE 3 Physical film thickness |
|---|---|---|
| 5 | $TiO_2$ | 195 nm |
| 6 | $SiO_2$ | 10 nm |
| 7 | $TiO_2$ | 190 nm |
| 8 | $SiO_2$ | 180 nm |
| 9 | $TiO_2$ | 10 nm |
| 10 | $SiO_2$ | 105 nm |
| 11 | $TiO_2$ | 175 nm |
| 12 | $SiO_2$ | 170 nm |
| 13 | $TiO_2$ | 80 nm |
| 14 | $SiO_2$ | 240 nm |
| 15 | $TiO_2$ | 30 nm |
| 16 | $SiO_2$ | 145 nm |
| 17 | $TiO_2$ | 45 nm |
| 18 | $SiO_2$ | 135 nm |
| 19 | $TiO_2$ | 20 nm |
| 20 | $SiO_2$ | 70 nm |
| 21 | $TiO_2$ | 105 nm |
| 22 | $SiO_2$ | 45 nm |
| 23 | $TiO_2$ | 40 nm |
| 24 | $SiO_2$ | 45 nm |
| 25 | $TiO_2$ | 105 nm |
| 26 | $SiO_2$ | 260 nm |

EXAMPLE 4

The present example relates to a method for forming a spectral filter through which a difference between specific color groups is enhanced, and in detail, to a method for forming a spectral filter to distinguish whether or not the cosmetics are uniformly applied onto the entire skin when cosmetics are applied onto one's skin.

First, given that colors of face bare skin have been set as an A group, and colors after commercially-manufactured cosmetics (ESPRIQUE BEAUTIFUL FINISH OC-410 manufactured by KOSE Corporation.) are applied on a face have been set as a B group, and colorimetry for an arbitrary three face regions has been carried out respectively in a case of bare skin and in a case in which the above-described cosmetics are applied to the skin by using a standard light source D65, and a total of six colors have been regarded as colors of an object to be observed (that is, an object color group). Then, a spline function model with the number of parameters 16 is used by use of the spectral distributions of the respective reflected lights.

Here, in the same way as in the example 3, a color difference at the time of viewing the object via the filter has been set to $\Delta E^F_{i,j}$, and an evaluated value $e_{i,j}$ has been formed as $$e_{i,j} = f_{3-1}(\Delta E_{i,j}^F) = \Delta E_{i,j}^F. \quad \text{[Formula 24]}$$

Therefore, a performance evaluated value A is formed as $$A = \sum_{i,j=1}^{N=6} W_{i,j} e_{i,j} = \sum_{i,j=1}^{N=6} W_{i,j} \Delta E_{i,j}^{F} (i < j). \quad \text{[Formula 25]}$$

Here, in order to make smaller a color difference with respect to the colors in the same color group, and to make larger a color difference with respect to the colors in the different color groups, that is, in order to respectively to make smaller color differences between the colors in the group A and between the colors in the group B, and to make larger a color difference between the color of the group A and the color of the group B, $W_{i,j}$ is set to $$W_{i,j} = \begin{cases} +1: & i \text{ and } j \text{ are different color group} \\ -1: & i \text{ and } j \text{ are the same color group} \end{cases} \quad [\text{Formula 26}]$$

Note that the spline function model used as a spectral transmittance model for the spectral filter is represented by the same formula as in the example 2, which is represented by formula 27.

$$T(\lambda) = \sum_{k=1}^{16} p_k B_k(\lambda) \text{ where} \quad [\text{Formula 27}]$$

$$B_k(\lambda) = \begin{cases} \left\{ \begin{array}{l} \omega^3 + 3\omega^2(\omega - |\lambda - \lambda_k|) + \\ 3\omega(\omega - |\lambda - \lambda_k|)^2 - \\ 3(\omega - |\lambda - \lambda_k|)^3 \end{array} \right\} / 6\omega^3 : & \text{when } |\lambda - \lambda_k| \le \omega \\ (2\omega - |\lambda - \lambda_k|)^3 / 6\omega^3 : & \text{when } \omega \le |\lambda - \lambda_k| \le 2\omega \\ 0 : & \text{when } 2\omega \le |\lambda - \lambda_k| \end{cases}$$

Figure 8:
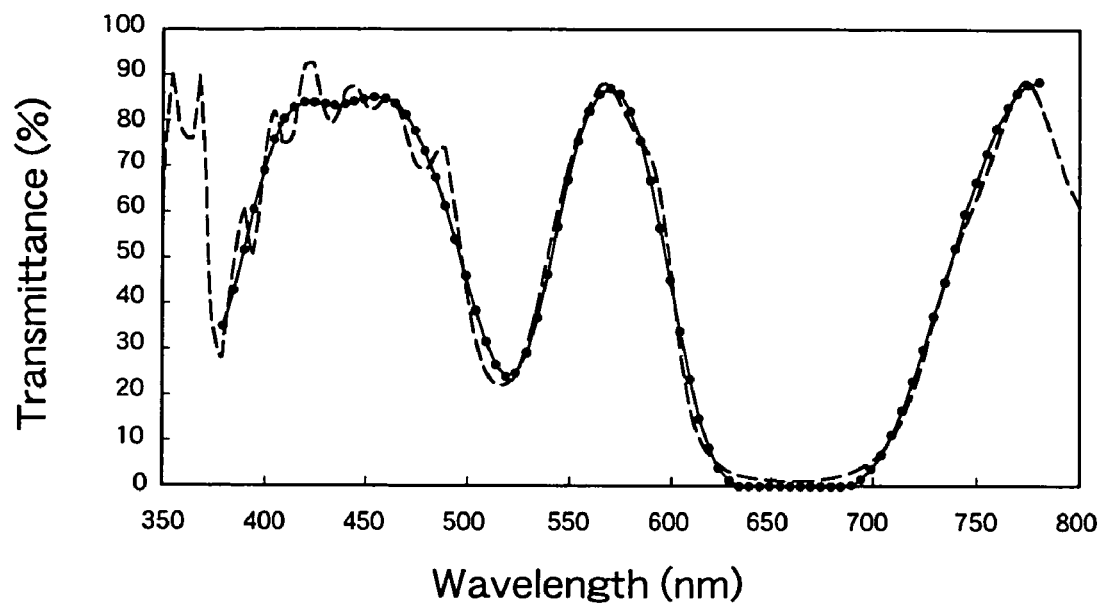
FIG. 8 is a graph showing spectral transmittances (solid line) obtained by optimizations and spectral transmittances (dotted line) obtained by a film forming simulation in an example 4.

Here, 380 to 780 nm is an analysis object, $\lambda_k$ is set so as to range from 350 to 800 nm at intervals of 30 nm, and $\omega=6$. Then, optimizations are repeated until the performance evaluated value A of the formula 25 becomes a maximum value, to determine an optimum $T(\lambda)$ (a number of optimizations: 100000 times). The obtained optimum $T(\lambda)$ is shown by the solid line in the graph of FIG. 8.

Note that initial values of the parameters $p_1, p_2 \ldots$, and $p_{16}$ are all set to 0.75. Additionally, a film forming simulation in which SiO$_2$ and TiO$_2$ are laminated has been carried out, and it has been confirmed that it is possible to physically realize a characteristic approximate to the theoretical design. The characteristic obtained by this film forming simulation is shown by the dotted line in the graph of FIG. 8. The film configuration at this time has a total of 19 layers, which are alternate layers of SiO$_2$ and TiO$_2$. Note that the film configuration has been determined in the same way as in the example 1, which is shown in Table 3.

TABLE 3

| Layer No. | Thin film material | EXAMPLE 4 Physical film thickness |
|---|---|---|
| 1 | SiO$_2$ | 110 nm |
| 2 | TiO$_2$ | 85 nm |
| 3 | SiO$_2$ | 145 nm |
| 4 | TiO$_2$ | 80 nm |
| 5 | SiO$_2$ | 285 nm |
| 6 | TiO$_2$ | 85 nm |
| 7 | SiO$_2$ | 135 nm |
| 8 | TiO$_2$ | 90 nm |
| 9 | SiO$_2$ | 150 nm |
| 10 | TiO$_2$ | 15 nm |
| 11 | SiO$_2$ | 130 nm |
| 12 | TiO$_2$ | 55 nm |
| 13 | SiO$_2$ | 115 nm |
| 14 | TiO$_2$ | 75 nm |
| 15 | SiO$_2$ | 170 nm |
| 16 | TiO$_2$ | 200 nm |
| 17 | SiO$_2$ | 35 nm |
| 18 | TiO$_2$ | 70 nm |
| 19 | SiO$_2$ | 75 nm |

Further, the results in which color differences between the bare skin of the face and colors after applying cosmetics to the face with respect to a case with no filter and a case in which the object has been viewed via the filter respectively have been calculated by use of the formula 8, are shown in Table 4.

It can be understood from the results shown in Table 4 that the color difference in the case with the filter is greater by approximately 40% than the color difference in the case with no filter, and when the object has been viewed via the filter, it has been made easy to distinguish uneven makeup.

TABLE 4

|  |  | L* | a* | b* | ΔE*$_{94}$ |
|---|---|---|---|---|---|
| With no filter | Bare skin | 79.10 | 13.77 | 21.22 | 4.14 |
|  | Skin wearing makeup | 82.05 | 13.03 | 26.23 |  |
| With filter | Bare skin | 58.73 | −3.00 | −2.22 | 5.76 |
|  | Skin wearing makeup | 61.75 | −3.92 | 2.95 |  |

EXAMPLE 5

The present example relates to a method for forming a spectral reflecting mirror (reflection type spectral filter) through which a difference between specific color groups is enhanced, and in detail, to a method for forming a spectral reflecting mirror to distinguish whether the cosmetics are uniformly applied to the entire skin or the cosmetics after applying the cosmetics are removed due to a reflected light from the mirror when cosmetics are applied to one's skin.

Figure 10A:
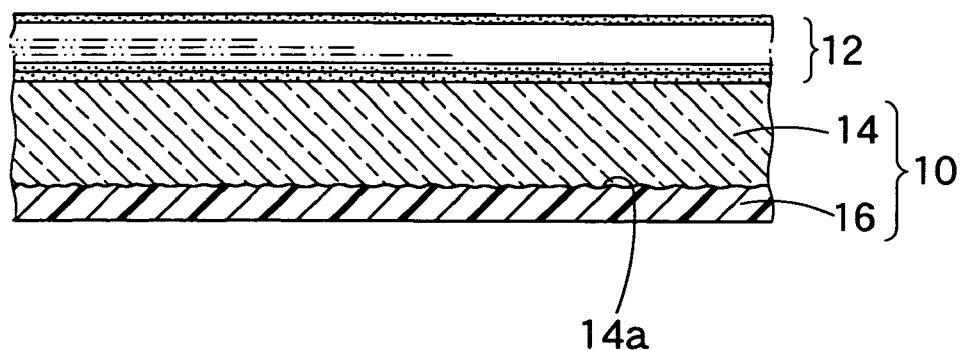
FIG. 10 are cross sectional views of models showing respective examples of reflection type spectral filters.

A multilayer film 12 having a film configuration of a total of 19 layers, which are alternate layers of SiO$_2$ and TiO$_2$ shown in Table 5, is formed on an opaque base material 10 shown in FIG. 10A.

A design (computation method) for the multilayer film has been carried out to obtain an optimum $M(\lambda)$ in the same way as in the example 4 except for the point that a spectral transmittance $T(\lambda)$ is replaced with a spectral reflectance $M(\lambda)$ of the multilayer, and a color difference $\Delta E^F_{i,j}$ when the object is viewed via the filter is replaced with a color difference $\Delta E^M_{i,j}$ when the object is viewed through the reflecting mirror. On the basis of the $M(\lambda)$ obtained in this way, a film configuration of the multilayer (spectral filter) showing a desired spectral reflectance has been determined by use of a film designing software "The Essential Macleod" (Thin Film Center Inc., USA) (refer to Table 5).

Figure 11:
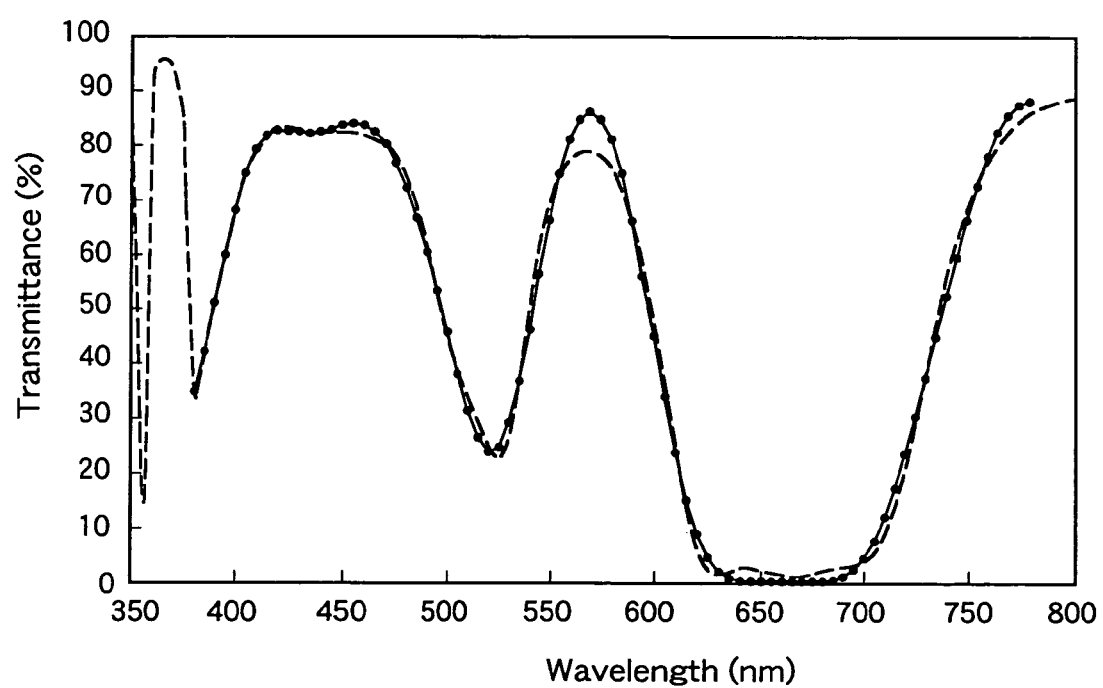
FIG. 11 is a graph showing spectral reflectances (solid line) obtained by optimizations and spectral reflectances (dotted line) obtained by a film forming simulation in an example 5.

The obtained $M(\lambda)$ is shown by the solid line in the graph of FIG. 11. Additionally, a film forming simulation has been carried out, and it has been confirmed that it is possible to physically realize a characteristic approximate to the theoretical design. The characteristic obtained by this film forming simulation is shown by the dotted line in the graph of FIG. 11.

The opaque base material 10 is formed such that, after an opposite surface (i.e., a rear surface) 14a of the multilayer film 12 side of a glass base material 14 in which the multilayer film 12 is formed on its surface is processed into a ground glass state so as to diffusely reflect an incident light, a black light absorption agent ("Acrylic Lacquer" manufactured by Daishin Paint Co., Ltd.) is applied thereto to form a light-blocking film 16 that blocks a reflected light on the rear surface of the filter and a transmitted light from the rear surface.

TABLE 5

| Layer No. | Thin film material | EXAMPLE 5 Physical film thickness |
|---|---|---|
| 1 | SiO$_2$ | 95 nm |
| 2 | TiO$_2$ | 100 nm |
| 3 | SiO$_2$ | 80 nm |
| 4 | TiO$_2$ | 25 nm |
| 5 | SiO$_2$ | 50 nm |
| 6 | TiO$_2$ | 75 nm |
| 7 | SiO$_2$ | 160 nm |
| 8 | TiO$_2$ | 65 nm |
| 9 | SiO$_2$ | 75 nm |
| 10 | TiO$_2$ | 60 nm |
| 11 | SiO$_2$ | 25 nm |
| 12 | TiO$_2$ | 65 nm |
| 13 | SiO$_2$ | 125 nm |
| 14 | TiO$_2$ | 125 nm |
| 15 | SiO$_2$ | 25 nm |
| 16 | TiO$_2$ | 110 nm |
| 17 | SiO$_2$ | 35 nm |
| 18 | TiO$_2$ | 25 nm |
| 19 | SiO$_2$ | 225 nm |

Figure 10B:
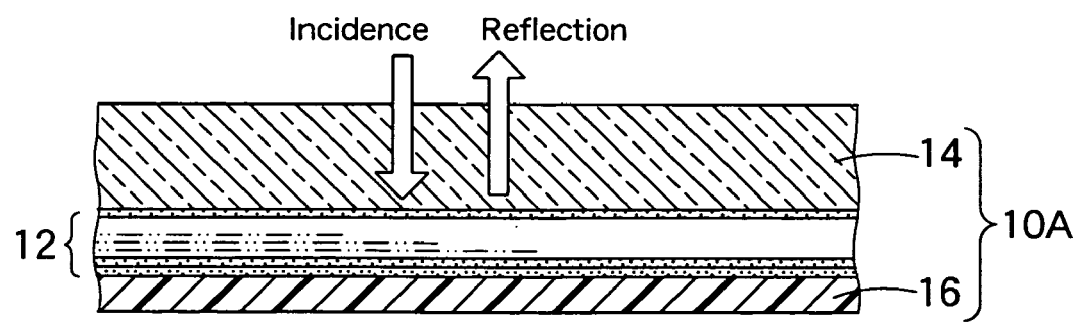

Note that, in the above-described example, the spectral reflecting mirror may have a structure in which the light-blocking film 16 is formed on the rear surface side of the glass base material 14, and the multilayer film 12 is formed between the glass base material 14 and the light-blocking film 16 as shown in FIG. 10B, and further, a protective clear coating film is formed on the surface of the multilayer film 12 in FIG. 10A.

Further, the list of the Reference Documents quoted in the specification is shown below.
(1) H. Brettel, F. Vienot, J. D. Mollon, Computerized simulation of color appearance for dichromats, J. Opt. Soc. Am. A, Vol. 1, No. 10, pp. 2647-2655, 1997
(2) CIE Publication 116-1995, Industrial colour-difference evaluation (Technical Report), CIE Central Bureau, Vienna, 1995.
(3) S. Kirtpatrick, C. D. Jr. Gelatt, M. P. Vecchi, Optimization by simulated annealing, Science, Vol. 220, pp. 671-680, 1983
(4) Hiroshi Ichikawa, Seiichi Mishima, Isamu Tsukahara, Yasuo Uemura, Glasses MOOK16 Achromatopsy, Kanahara & Co., Ltd., pp. 139-147, 1982

The invention claimed is:

1. A method for forming a transmission type spectral filter having a multilayer film on a transparent base material, the method comprising the steps of:
describing a spectral transmittance $T(\lambda)$ of the multilayer film as $T(\lambda)=T(p_1, p_2, \ldots, p_n)$ by using parameters $p_1, p_2, \ldots,$ and $p_n$ composed of divided wavelength intervals and transmittances corresponding to the respective wavelength intervals, or function parameters $p_1, p_2, \ldots,$ and $p_n$ when transmittances at a given wavelength are represented as a function model;
optimizing the parameters $p_1, p_2, \ldots$ and $p_n$ such that a sensitivity difference pattern formed from sensitivity differences in a sensitivity wavelength band of a light receiving member via the multilayer film between combined two colors for arbitrary combinations that two colors in an object color group consisting of a plurality of specified colors are combined, is made into a desired sensitivity difference pattern; and
forming the transmission type spectral filter on the basis of an optimum $T(\lambda)$ described by using the optimized parameters $p_1, p_2, \ldots,$ and $p_n$; and wherein the optimum $T(\lambda)$ is set such that, in specific combinations among the respective combinations, a color difference via the spectral filter is less than a color difference without the spectral filter, and in the other specific combinations, a color difference via the spectral filter is greater than a color difference without the spectral filter.

2. The method for forming a functional spectral filter according to claim 1, the method further comprising the steps of:
(O) initializing the spectral transmittance $T(\lambda)$ by setting an initial value to the respective parameters the first time, and setting the spectral transmittance $T(\lambda)$ by resetting the respective parameters on the basis of an optimization approach on and after the second time;
(I) calculating $C_i=f_1(T(\lambda)R_i(\lambda)E(\lambda))$, which is sensitivity of the respective colors in the object color group when those are observed through the functional spectral filter having the spectral transmittance $T(\lambda)$;
(II) calculating $\Delta E_{i,j}=f_2(C_i, C_j)$, which are sensitivity differences between combined two colors in the respective combinations that two colors in the object color group are combined, on the basis of the sensitivity; and
(III) calculating a performance evaluated value A at the spectral transmittance $T(\lambda)$ on the basis of the following formula in which weighting factors $W_{i,j}$ are set such that $T(\lambda)$ becomes the optimum $T(\lambda)$ when A is maximized;

[Formula 1]
when there is a target value $\Delta E'_{i,j}$ for each $\Delta E_{i,j}$, $$A = \sum_{\substack{i,j=1 \\ i<j}}^{N} W_{i,j} f_3(\Delta E_{i,j}, \Delta E'_{i,j}) \quad (a)$$

when there is no target value for each $\Delta E_{i,j}$, $$A = \sum_{\substack{i,j=1 \\ i<j}}^{N} W_{i,j} f_{3-1}(\Delta E_{i,j}) \quad (b)$$

wherein, when a number of colors in the object color group in an object to be observed is N, after spectral reflectances $R_i(\lambda)$ (i=1 to N) of respective colors in the object color group and a spectral distribution $E(\lambda)$ of an illumination light are set, the steps of (O), (I), (II), and (III) are repeated in this order until the performance evaluated value A is maximized, and $T(\lambda)$ when the performance evaluated value A is maximized is regarded as the optimum $T(\lambda)$.

3. The method for forming a functional spectral filter according to claim 2, wherein the optimum $T(\lambda)$ is set such that, in specific combinations among the respective combinations, a color difference via the spectral filter is less than a color difference without the spectral filter, and in the other specific combinations, a color difference via the spectral filter is greater than a color difference without the spectral filter.

4. The method for forming a functional spectral filter according to claim 2, wherein a standard of calculation of the sensitivity difference is set to CIE94, the International Commission on Illumination's 1994 formula for the calculation of color difference, and the optimization approach is set to a simulated annealing method.

5. The method for forming a functional spectral filter according to claim 4, wherein the optimum $T(\lambda)$ is set such that, in specific combinations among the respective combinations, a color difference via the spectral filter is less than a color difference without the spectral filter, and in the other specific combinations, a color difference via the spectral filter is greater than a color difference without the spectral filter.

6. The method for forming a functional spectral filter according to claim 1, wherein
the optimum $T(\lambda)$ is set such that color differences for arbitrary combinations which a color deficient observer senses via the spectral filter are greater than those without the spectral filter; and
the functional spectral filter through which a distinction when a color deficient observer distinguishes the respective colors in the object color group is made easy is formed.

7. The method for forming a functional spectral filter according to claim 1, wherein
the optimum $T(\lambda)$ is set such that difficulty when a color normal observer distinguishes the respective colors in the object color group is made close to the level of difficulty when a color deficient observer distinguishes the respective colors in the object color group by using the color differences for arbitrary combinations which the color deficient observer senses; and
the functional spectral filter through which a distinction when a color normal observer distinguishes the respective colors in the object color group is made difficult is formed.

8. The method for forming a functional spectral filter according to claim 1, wherein
the object color group consists of a plurality of colors of a portion to which cosmetics are applied, and a plurality of colors of a portion to which cosmetics are not applied, of an object to be observed;
the optimum $T(\lambda)$ is set such that, among the colors of the portion to which cosmetics are applied and the colors of the portion to which cosmetics are not applied, color differences via the spectral filter are respectively less than color differences without the spectral filter, and between the color of the portion to which cosmetics are applied and the color of the portion to which cosmetics are not applied, a color difference via the spectral filter is greater than a color difference without the spectral filter; and
the functional spectral filter through which it is made easy to distinguish uneven application of cosmetics is formed.

9. A method for forming a reflection type spectral filter having a multilayer film on a surface of an opaque base material or between a transparent base material and a light-blocking layer provided on a rear surface side of the transparent base material, the method comprising the steps of:
describing a spectral reflectance $M(\lambda)$ of the multilayer film as $M(\lambda)=M(p_1, p_2, \ldots, and_{pn})$ by using parameters $p_1, p_2, \ldots,$ and $p_n$ composed of divided wavelength intervals and reflectances corresponding to the respective wavelength intervals, or function parameters $p_1, p_2, \ldots,$ and $p_n$ when reflectances at a given wavelength are represented as a function model;
optimizing the parameters $p_1, p_2, \ldots,$ and $p_n$ such that a sensitivity difference pattern formed from sensitivity differences in a sensitivity wavelength band of a light receiving member via a reflection of the multilayer film between combined two colors for arbitrary combinations that two colors in an object color group consisting of a plurality of specified colors are combined, is made into a desired sensitivity difference pattern; and
forming the reflection type spectral filter on the basis of an optimum $M(\lambda)$ described by using the optimized parameters $p_1, p_2, \ldots,$ and $p_n$; and
wherein the optimum $M(\lambda)$ is set such that, in specific combinations among the respective combinations, a color difference via a reflection of the spectral filter is less than a color difference without a reflection of the spectral filter, and in the other specific combinations, a color difference via a reflection of the spectral filter is greater than a color difference without a reflection of the spectral filter.

10. The method for forming a functional spectral filter according to claim 9, the method further comprising the steps of:
(O) initializing the spectral reflectance $M(\lambda)$ by setting an initial value to the respective parameters the first time, and setting the spectral reflectance $M(\lambda)$ by resetting the respective parameters on the basis of an optimization approach on and after the second time;
(I) calculating $C_i=f_1(M(\lambda)R_i(\lambda)E(\lambda))$, which is sensitivity of the respective colors in the object color group when those are observed via a reflection of the functional spectral filter having the spectral reflectance $M(\lambda)$;
(II) calculating $\Delta E_{i,j}=f_2(C_i, C_j)$, which are sensitivity differences between combined two colors in the respective combinations that two colors in the object color group are combined, on the basis of the sensitivity; and
(III) calculating a performance evaluated value A at the spectral reflectance $M(\lambda)$ on the basis of the following formula in which weighting factors $W_{i,j}$ are set such that $M(\lambda)$ becomes the optimum $M(\lambda)$ when A is maximized;
[Formula 2]
when there is a target value $\Delta E^t_{i,j}$ for each $\Delta E_{i,j}$, $$A = \sum_{\substack{i,j=1 \\ i<j}}^{N} W_{i,j} f_3(\Delta E_{i,j}, \Delta E^t_{i,j}) \qquad (a)$$

when there is no target value for each $\Delta E_{i,j}$, $$A = \sum_{\substack{i,j=1 \\ i<j}}^{N} W_{i,j} f_{3-1}(\Delta E_{i,j}) \qquad (b)$$

wherein, when a number of colors in the object color group in an object to be observed is N, after spectral reflectances $R_i(\lambda)$ (i=1 to N) of respective colors in the object color group and a spectral distribution $E(\lambda)$ of an illumination light are set, the steps of (O), (I), (II), and (III) are repeated in this order until the performance evaluated value A is maximized, and $M(\lambda)$ when the performance evaluated value A is maximized is regarded as the optimum $M(\lambda)$.

11. The method for forming a functional spectral filter according to claim 10, wherein a standard of calculation of the color difference is set to CIE94, the International Commission on Illumination's 1994 formula for the calculation of color difference, and the optimization approach is set to a simulated annealing method.

12. The method for forming a functional spectral filter according to claim 9, wherein the optimum M(λ) is set such that a color difference via a reflection of the spectral filter is greater than a color difference without a reflection of the spectral filter; and the functional spectral filter through which it is made easy to distinguish the respective colors in the object color group is formed.

13. The method for forming a functional spectral filter according to claim 9, wherein the object color group consists of a plurality of colors of a portion to which cosmetics are applied, and a plurality of colors of a portion to which cosmetics are not applied, of an object to be observed;

the optimum M(λ) is set such that, among the colors of the portion to which cosmetics are applied and among the colors of the portion to which cosmetics are not applied, a color difference via a reflection of the spectral filter is less than a color difference without a reflection of the spectral filter, and between the color of the portion to which cosmetics are applied and the color of the portion to which cosmetics are not applied, a color difference via a reflection of the spectral filter is greater than a color difference without a reflection of the spectral filter; and the functional spectral filter through which it is made easy to distinguish uneven application of cosmetics is made.

* * * * *